United States Patent
Kubota et al.

(10) Patent No.: US 9,963,006 B2
(45) Date of Patent: May 8, 2018

(54) DAMPER CONTROL DEVICE

(71) Applicant: KAYABA INDUSTRY CO., LTD., Tokyo (JP)

(72) Inventors: Tomoo Kubota, Kanagawa (JP); Masatoshi Okumura, Gifu (JP)

(73) Assignee: KYB Corporation, Tokyo (JP)

( * ) Notice: Subject to any disclaimer, the term of this patent is extended or adjusted under 35 U.S.C. 154(b) by 0 days. days.

(21) Appl. No.: 14/765,477

(22) PCT Filed: Mar. 13, 2014

(86) PCT No.: PCT/JP2014/056767
§ 371 (c)(1),
(2) Date: Aug. 3, 2015

(87) PCT Pub. No.: WO2014/142268
PCT Pub. Date: Sep. 18, 2014

(65) Prior Publication Data
US 2015/0367702 A1    Dec. 24, 2015

(30) Foreign Application Priority Data

Mar. 13, 2013  (JP) .................................. 2013-050132

(51) Int. Cl.
*B60G 17/015* (2006.01)
*B60G 17/08* (2006.01)
(Continued)

(52) U.S. Cl.
CPC ....... *B60G 17/0165* (2013.01); *B60G 17/018* (2013.01); *B60G 2400/821* (2013.01); *B60G 2500/106* (2013.01); *B60G 2800/162* (2013.01)

(58) Field of Classification Search
None
See application file for complete search history.

(56) References Cited

U.S. PATENT DOCUMENTS 4,685,698 A    8/1987    Klinkner et al.
5,444,621 A    8/1995    Matsunaga et al.
(Continued)

FOREIGN PATENT DOCUMENTS

DE    3518503 C1    10/1986
DE    3930517 A1    1/1991
(Continued)

*Primary Examiner* — Thomas G Black
*Assistant Examiner* — Demetra R Smith-Stewart
(74) *Attorney, Agent, or Firm* — Rabin & Berdo, P.C.

(57) ABSTRACT

A damper control device controls a damping force of each damper interposed between a vehicle body and a corresponding one of a plurality of vehicle wheels of a vehicle. The damper control device includes: a good wavy road control calculation unit that obtains, for each damper, a good wavy road control instruction suitable for a good wavy road representing a wavy road surface; a bad wavy road control calculation unit that obtains, for each damper, a bad wavy road control instruction suitable for a bad wavy road that has more concavities and convexities than the good wavy road; and a final instruction calculation unit that obtains a final control instruction for each damper based on the good wavy road control instruction and on the bad wavy road control instruction.

12 Claims, 21 Drawing Sheets

(51) Int. Cl.
  *B60G 17/0165* (2006.01)
  *B60G 17/018* (2006.01)

(56) References Cited

U.S. PATENT DOCUMENTS

| | | | | |
|---|---|---|---|---|
| 5,539,640 | A * | 7/1996 | Kishimoto | B60G 17/0165 701/40 |
| 6,176,494 | B1 | 1/2001 | Ichimaru et al. | |
| 6,298,293 | B1 * | 10/2001 | Ohsaku | B60G 17/016 188/266.1 |
| 6,412,788 | B1 | 7/2002 | Ichimaru | |
| 7,526,665 | B2 * | 4/2009 | Kim, II | B60G 17/015 701/37 |
| 7,593,797 | B2 * | 9/2009 | Izawa | B60G 17/0165 267/218 |
| 8,032,282 | B2 * | 10/2011 | Yamanaka | B60G 17/018 280/5.515 |
| 8,688,342 | B2 * | 4/2014 | Ohta | B60W 10/06 701/70 |
| 8,783,118 | B2 * | 7/2014 | Kato | B62D 5/0409 73/862.335 |
| 8,818,630 | B2 * | 8/2014 | Kobayashi | B60W 10/08 340/440 |
| 2007/0156314 | A1 * | 7/2007 | Tomida | B60G 17/0152 701/37 |
| 2008/0009992 | A1 * | 1/2008 | Izawa | B60G 17/08 701/37 |
| 2009/0248247 | A1 * | 10/2009 | Furuichi | B60G 17/016 701/37 |
| 2010/0138108 | A1 * | 6/2010 | Kajino | B60G 17/016 701/38 |
| 2011/0025000 | A1 * | 2/2011 | Inoue | B60G 17/0157 280/5.507 |
| 2012/0029770 | A1 * | 2/2012 | Hirao | B60G 17/08 701/38 |
| 2012/0247888 | A1 * | 10/2012 | Chikuma | B60G 17/08 188/266.1 |
| 2013/0079988 | A1 * | 3/2013 | Hirao | B60W 10/22 701/38 |
| 2013/0166149 | A1 * | 6/2013 | Liu | B60G 17/015 701/37 |
| 2014/0005888 | A1 * | 1/2014 | Bose | B60G 17/0165 701/37 |
| 2014/0005889 | A1 * | 1/2014 | Hayakawa | B60G 17/01933 701/38 |
| 2014/0095024 | A1 * | 4/2014 | Hirao | B60G 17/018 701/37 |
| 2016/0046166 | A1 * | 2/2016 | Norton | B60G 17/018 701/37 |

FOREIGN PATENT DOCUMENTS

| | | |
|---|---|---|
| JP | H05-229328 A | 9/1993 |
| JP | H07-117433 A | 5/1995 |
| JP | H11-192826 A | 7/1999 |
| JP | 2000-280720 A | 10/2000 |
| JP | 2007-083813 A | 4/2007 |
| JP | 2008-238921 A | 10/2008 |
| JP | 2010-185528 A | 8/2010 |
| JP | 2012-206560 A | 10/2012 |

* cited by examiner

DAMPER CONTROL DEVICE

TECHNICAL FIELD

The present invention relates to a damper control device.

BACKGROUND ART

JP 2008-238921A discloses a damper control device that controls a damping force of a damper interposed between a sprung member and an unsprung member of a vehicle. The damper control device estimates a condition of a road surface on which the vehicle is running from an effective value of vibration of the sprung member in a sprung resonant frequency range, an effective value of vibration of the sprung member in an unsprung resonant frequency range, and an effective value of vibration of the sprung member in an intermediate frequency range between the sprung resonant frequencies and unsprung resonant frequencies. The damper control device causes the damper to output a damping force suitable for the estimated road surface condition.

Such a damper control device is capable of determining the road surface condition, and therefore improving the ride quality of the vehicle by causing the damper to generate a damping force suitable for the road surface condition.

SUMMARY OF INVENTION

The foregoing damper control device determines one of the following categories that the road surface on which the vehicle is running falls in: a waved road, a bumpy road, a good road, and a lightly paved road. However, the foregoing damper control device is not capable of determining a condition of a road surface that falls in a plurality of categories, such as a waved and irregular road surface. Therefore, in this case, it is difficult for the damper control device to cause the damper to exert an optimal damping force.

Meanwhile, in the case of a passenger car and the like, dampers in four wheels each exert a damping force suitable for one type of road surface condition. However, all of the four wheels do not always run on a road surface of the same condition. Therefore, in a case where the wheels of the vehicle run on road surfaces of different conditions, it is impossible for all of the dampers in the wheels to exert a damping force optimal for the conditions of the road surfaces on which their respective wheels are actually running. As a result, the ride quality of the vehicle and the road surface tracking property decrease.

It is an object of the present invention to provide a damper control device that is capable of causing all of dampers of wheels to exert a damping force optimal for a road surface condition, and improving the road surface tracking property and the ride quality of the vehicle.

According to one aspect of the present invention, a damper control device controls a damping force of each damper interposed between a vehicle body and a corresponding one of a plurality of vehicle wheels of a vehicle. The damper control device includes: a good wavy road control calculation unit configured to obtain, for each damper, a good wavy road control instruction suitable for a good wavy road representing a wavy road surface; a bad wavy road control calculation unit that obtains configured to obtain, for each damper, a bad wavy road control instruction suitable for a bad wavy road that has more concavities and convexities than the good wavy road; and a final instruction calculation unit that obtains configured to obtain, for each damper, a final control instruction for each damper based on on the basis of the good wavy road control instruction and on the bad wavy road control instruction.

DESCRIPTION OF EMBODIMENTS

Described below is an embodiment of the present invention with reference to the accompanied drawings.

Figure 1:
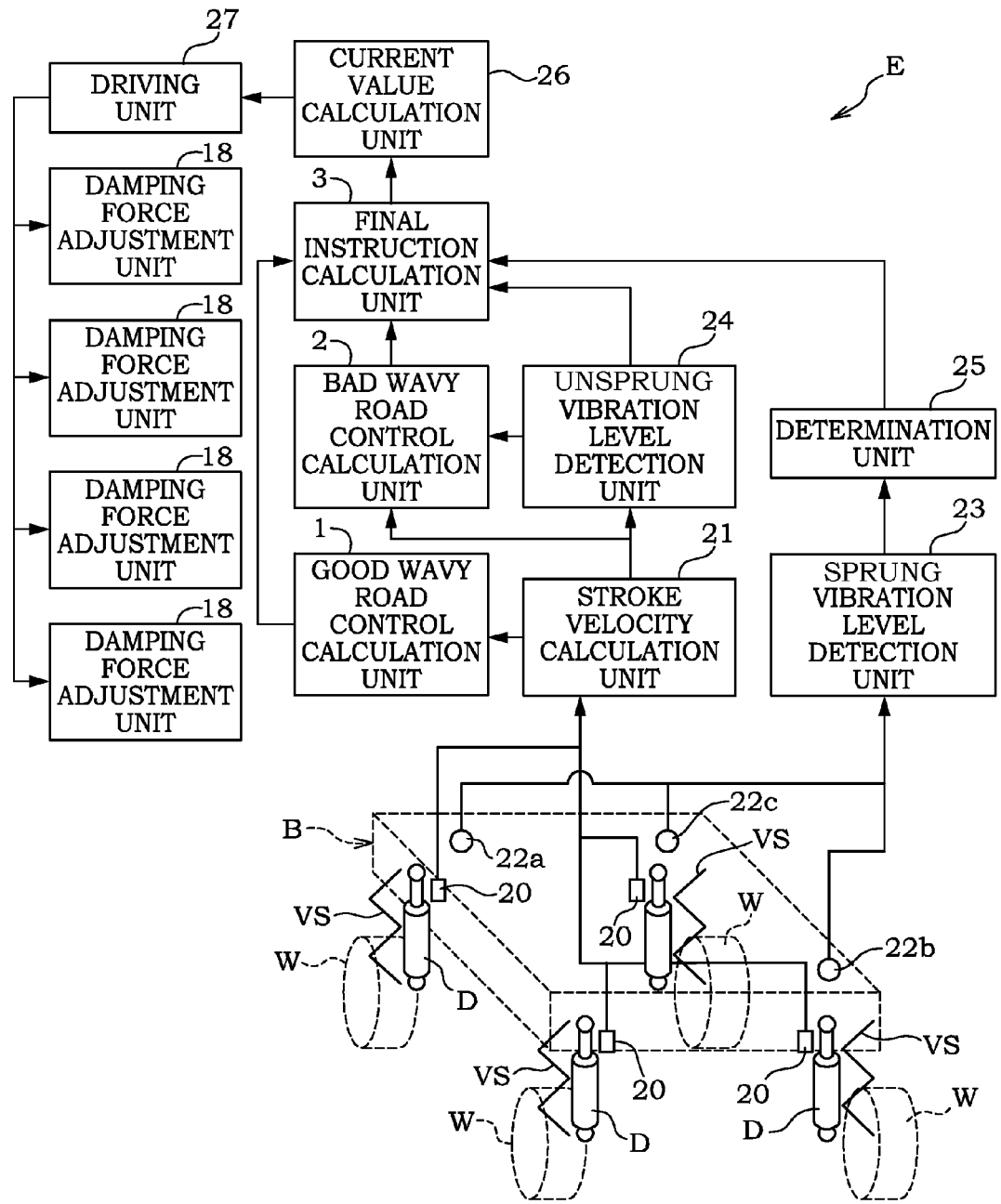
FIG. 1 shows a configuration of a damper control device according to an embodiment of the present invention.

As shown in FIG. 1, a damper control device E controls a damping force of each of four dampers D that are interposed between a vehicle body B and four vehicle wheels W of a vehicle. The damper control device E includes a good wavy road control calculation unit 1, a bad wavy road control calculation unit 2, and a final instruction calculation unit 3. The good wavy road control calculation unit 1 obtains, for each damper D, a good wavy road control instruction Fg suitable for a good wavy road. The bad wavy road control calculation unit 2 obtains, for each damper D, a bad wavy road control instruction Fb suitable for a bad wavy road. The final instruction calculation unit 3 obtains, for each damper D, a final control instruction Ff on the basis of the good wavy road control instruction Fg and the bad wavy road control instruction Fb.

Figure 19:
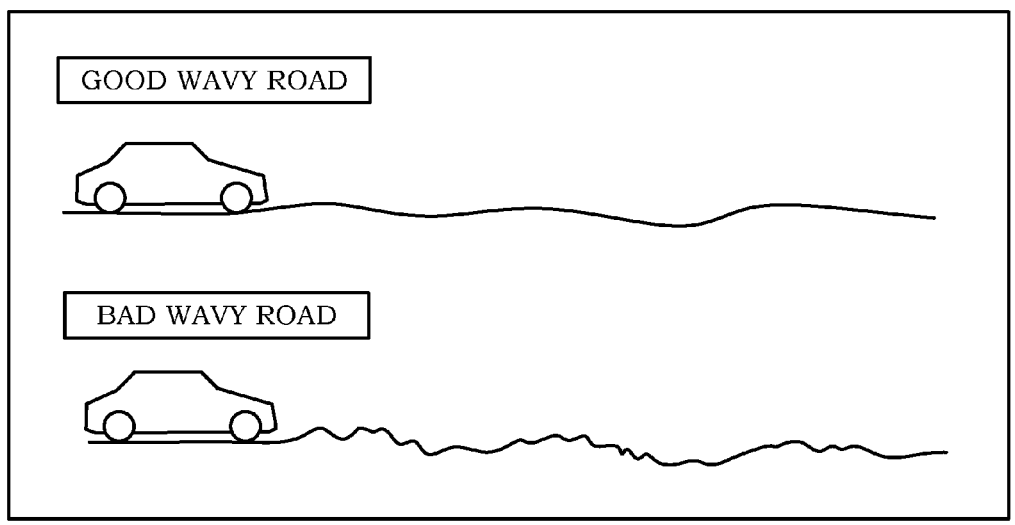
FIG. 19 schematically shows a good wavy road and a bad wavy road.

It should be noted that a road with a waved road surface is referred to as a "wavy road", a smooth road with few concavities and convexities on a road surface is referred to as a "good road", and an uneven road with many concavities and convexities on a road surface is referred to as a "bad road". As shown in FIG. 19, a "good wavy road" is a combination of a wavy road and a good road and has a wavy road surface, whereas a "bad wavy road" is a combination of a wavy road and a bad road and has a road surface with more concavities and convexities than the good wavy road.

A damper D is interposed between a vehicle body B and a vehicle wheel W of a vehicle, and is arranged in parallel with a suspension spring VS that elastically supports the vehicle body B. It should be noted that the vehicle wheel W is joined to the vehicle body B by a link (not shown) swingably attached to the vehicle body B, and is capable of reciprocating in an up-down direction relative to the vehicle body B.

Figure 2:
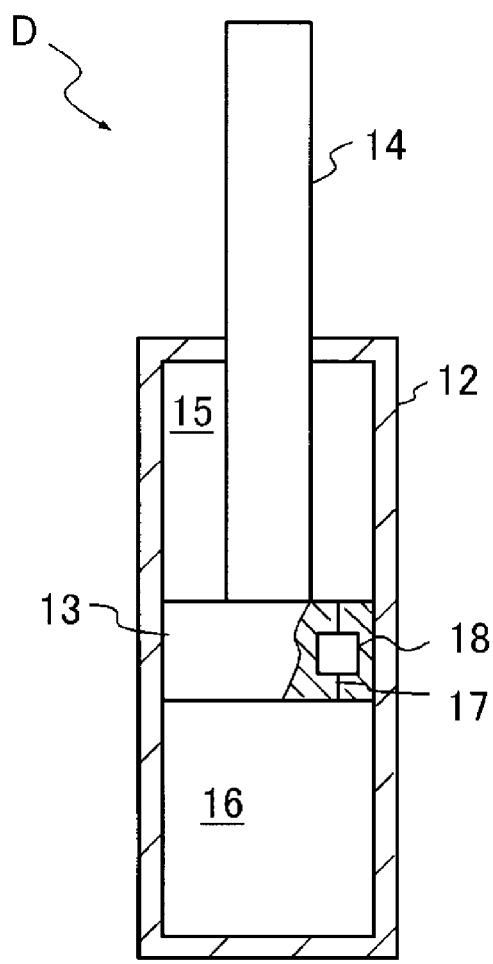
FIG. 2 shows a general cross section of a damper.

As shown in FIG. 2, the damper D is a fluid pressure damper including a cylinder 12, a piston 13, a piston rod 14, two pressure chambers 15, 16, a passage 17, and a damping force adjustment unit 18. The piston 13 is slidably inserted into the cylinder 12. The piston rod 14 is movably inserted into the cylinder 12 and joined to the piston 13. The two pressure chambers 15, 16 are defined inside the cylinder 12, are separated by the piston 13, and communicate with each other via the passage 17. The damping force adjustment unit 18 applies resistance to the flow of a fluid passing through the passage 17. When a fluid that fills the pressure chambers 15, 16 passes through the passage 17 in accordance with an extension/compression operation, the damper D exerts a damping force that suppresses the extension/compression operation by applying resistance to the fluid using the damping force adjustment unit 18. In this way, relative movements of a sprung member and an unsprung member are suppressed.

The fluid is a viscous magnetofluid and fills the pressure chambers 15, 16. The damping force adjustment unit 18 can cause a magnetic field to act on the passage 17. The damping force adjustment unit 18 can change a damping force of the damper D by adjusting a magnitude of the magnetic field using an amount of current supplied from the damper control device E so as to change the resistance applied to the flow of the viscous magnetofluid passing through the passage 17. The damper control device E controls the damping force of the damper D by increasing and reducing current provided to the damping force adjustment unit 18.

It should be noted that a viscous electrofluid may be used as the fluid in place of the viscous magnetofluid. In this case, it suffices for the damping force adjustment unit 18 to be an element that can cause an electric field to act on the passage 17. The damping force adjustment unit 18 can change a damping force generated by the damper D by adjusting a magnitude of the electric field using voltage provided by the damper control device E so as to change the resistance applied to the flow of the viscous electrofluid passing through the passage 17.

Other than the aforementioned viscous magnetofluid and viscous electrofluid, an operating oil, water, water solution, gas, and the like can be used as the fluid. In this case, the damping force adjustment unit 18 is constituted by a damping valve and an actuator with a high control response, such as a solenoid. The damping valve makes a flow passage area of the passage 17 of the damper D changeable. The actuator can regulate the flow passage area of the passage 17 by driving a valve body of the damping valve. The damping force adjustment unit 18 adjusts the flow passage area of the passage 17 by increasing and reducing an amount of current provided to the actuator. In this way, resistance applied to the flow of the fluid passing through the passage 17 is changed, and the damping force generated by the damper D can be adjusted.

In a case where the fluid is a liquid and the damper D is of a single-rod type, the damper D includes a gas chamber or a reservoir for compensating for a volume of the piston rod 14 that recedes from and enters the inside of the cylinder 12. In a case where the fluid is a gas, the damper D need not include the gas chamber and the reservoir. In a case where the damper D includes a reservoir and is of a uniflow type, that is, the fluid is discharged via a passage that leads from the inside of the cylinder 12 to the reservoir during extension and compression, the damping force adjustment unit 18 may be provided on the passage that leads from the cylinder 12 to the reservoir, and the damping force may be exerted by applying resistance to the flow of the fluid.

The damper D may be an electromagnetic damper that exerts a damping force suppressing relative movements of the sprung member and the unsprung member using an electromagnetic force. The electromagnetic damper is, for example, an element that includes a motor and a motion conversion mechanism that converts a rotary motion of the motor into a linear motion, a linear motor, and the like. In a case where the damper D is the electromagnetic damper, the damping force generated by the damper D can be adjusted by the damping force adjustment unit 18 functioning as a motor driving device that regulates current that flows through the motor or the linear motor.

As shown in FIG. 1, the damper control device E includes stroke sensors 20, a stroke velocity calculation unit 21, three acceleration sensors 22a, 22b, 22c, a sprung vibration level detection unit 23, an unsprung vibration level detection unit 24, a determination unit 25, the good wavy road control calculation unit 1, the bad wavy road control calculation unit 2, the final instruction calculation unit 3, a current value calculation unit 26, and a driving unit 27. The stroke sensors 20 detect stroke displacements of the dampers D. The stroke velocity calculation unit 21 obtains stroke velocities Vd from the stroke displacements of the dampers D detected by the stroke sensors 20. The acceleration sensors 22a, 22b, 22c detect accelerations of the vehicle body B in the up-down direction. The sprung vibration level detection unit 23 obtains a sprung vibration level LB of the vehicle body B from accelerations $\alpha 1$, $\alpha 2$, $\alpha 3$ of the vehicle body B in the up-down direction that have been detected by the acceleration sensors 22a, 22b, 22c, respectively. The unsprung vibration level detection unit 24 obtains unsprung vibration levels LW, which are magnitudes of vibrations of the vehicle wheels W in the up-down direction, from the stroke displacements of the dampers D detected by the stroke sensors 20. The determination unit 25 determines, from the sprung vibration level LB, whether or not a road surface on which the vehicle is running is a wavy road. The good wavy road control calculation unit 1 obtains, for each damper D, a good wavy road control instruction Fg suitable for a good wavy road. The bad wavy road control calculation unit 2 obtains, for each damper D, a bad wavy road control instruction Fb suitable for a bad wavy road. The final instruction calculation unit 3 obtains a final control instruction Ff on the basis of the result of determination by the determination unit 25, and on the good wavy road control instruction Fg and the bad wavy road control instruction Fb for each damper D. The current value calculation unit 26 obtains a current value I provided to a damping force adjustment unit 18 on the basis of the final control instruction Ff. The driving unit 27 supplies an amount of current compliant with the current value I obtained by the current value calculation unit 26 to the damping force adjustment unit 18.

Figure 20:
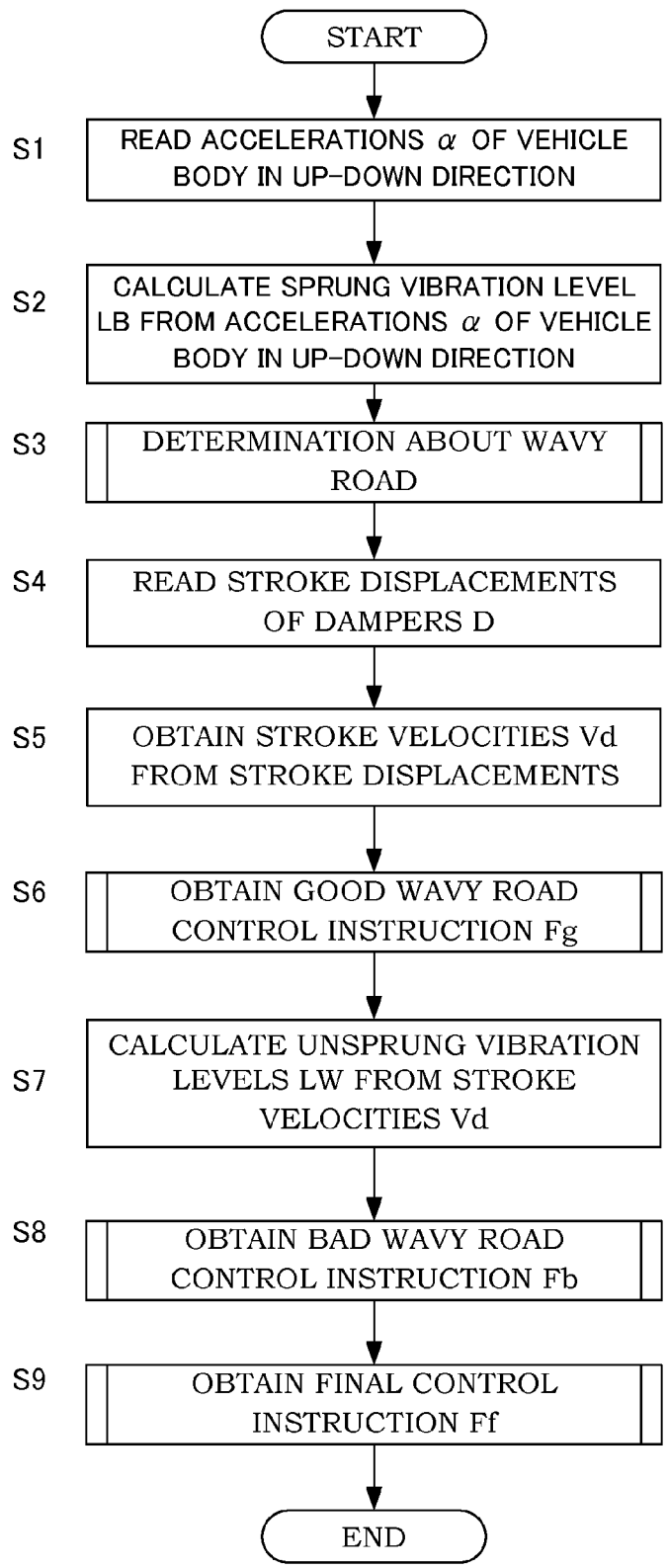
FIG. 20 is a flowchart showing the substance of processing executed by the damper control device.

FIG. 20 is a flowchart showing the substance of processing executed by the damper control device E. In step S1, the damper control device E detects accelerations of the vehicle body in the up-down direction from the acceleration sensors 22a, 22b, 22c that detect accelerations of the vehicle in the up-down direction. In step S2, the damper control device E calculates a sprung vibration level LB from the accelerations in the up-down direction detected in step S1. In step S3, the damper control device E determines whether or not the vehicle is running on a wavy road from the sprung vibration level LB. In step S4, the damper control device E reads stroke displacements of the dampers D from the stroke sensors that detect displacements of the dampers D. In step S5, the damper control device E calculates stroke velocities Vd from the stroke displacements read in step S4. In step S6, the damper control device E obtains a good wavy road control instruction Fg from the stroke velocities Vd. In step S7, the damper control device E calculates unsprung vibration levels LW from the stroke velocities Vd. In step S8, the damper control device E obtains a bad wavy road control instruction Fb from the stroke velocities Vd and the unsprung vibration levels LW. In step S9, the damper control device E obtains a final control instruction Ff from the good wavy road control instruction Fg and the bad wavy road control instruction Fb.

As shown in FIG. 1, the stroke velocity calculation unit 21 calculates the stroke velocities Vd of the dampers D by differentiating the stroke displacements of the dampers D detected by the stroke sensors 20.

The acceleration sensors 22a, 22b, 22c detect the accelerations α1, α2, α3 of the vehicle body B in the up-down direction, respectively, and input the results of detection to the sprung vibration level detection unit 23. The acceleration sensors 22a, 22b, 22c are installed at three arbitrary positions in the vehicle body B. Although not shown, the three arbitrary positions are horizontally coplanar but noncollinear. The sprung vibration level detection unit 23 calculates the sprung vibration level LB of the vehicle body B by processing the accelerations α1, α2, α3. It should be noted that the accelerations α1, α2, α3 have positive signs when they are upward.

The stroke velocities Vd calculated by the stroke velocity calculation unit 21 are input to the unsprung vibration level detection unit 24. The unsprung vibration level detection unit 24 obtains the unsprung vibration levels LW representing magnitudes of vibrations of unsprung members from the stroke velocities Vd.

The sprung vibration level detection unit 23 and the unsprung vibration level detection unit 24 will now be described.

First, a description is given of the principle of a method for detecting vibration levels in the sprung vibration level detection unit 23 and the unsprung vibration level detection unit 24.

Figure 3:
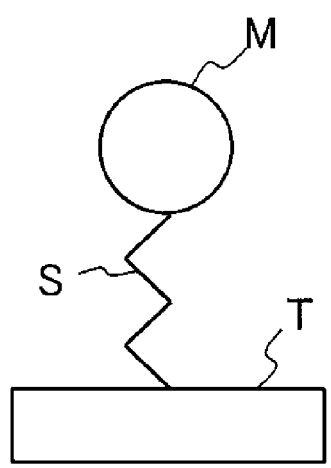
FIG. 3 is an explanatory diagram showing a system of an object whose vibration level is to be detected.

Assume a case in which a vibration level of a mass M is detected in a system where the mass M is borne by a spring S, as shown in FIG. 3. The mass M constitutes a spring-mass system in which the mass M is elastically supported by the spring S, which is vertically attached to a base T, from a lower side in the figure. A vibration level L of the mass M in the up-down direction in FIG. 3 is calculated on the basis of a first reference value a and a second reference value b, the first reference value a being the velocity of the mass M in the up-down direction, and the second reference value b being equivalent to a differential value or an integrated value of the first reference value a.

The first reference value a, which is the velocity of the mass M in the up-down direction, is calculated by, for example, integrating the acceleration of the mass M in the up-down direction detected by an acceleration sensor attached to the mass M.

In a case where the second reference value b is a displacement of the mass M in the up-down direction, the second reference value b is calculated by integrating the first reference value a. In a case where the second reference value b is equivalent to a differential value of the first reference value a, that is to say, in a case where the second reference value b is the acceleration of the mass M in the up-down direction, the second reference value b may be set to the acceleration in the up-down direction detected by the acceleration sensor, or may be calculated by differentiating the first reference value a using a differentiator.

Also, in order to enable detection of a vibration level in an arbitrary frequency range among vibration levels of the mass M that are desired to be detected, frequency components that are desired to be detected from the first reference value a and the second reference value b are extracted. Specifically, frequency components of the first reference value a and the second reference value b that are desired to be detected are calculated by filtering the first reference value a and the second reference value b using a band-pass filter and the like. Basically, vibration of the mass M with a high spectral density can be extracted by setting a natural frequency of the spring-mass system of the mass M and the spring S to a frequency extracted using a filter. The band-pass filter is useful as it enables extraction of vibration in a frequency range that is desired to be evaluated, as well as removal of noise superimposed on vibration of the mass M and the like. However, the band-pass filter may be omitted, for example, in a case where the mass M vibrates in a single cycle.

Vibration of the mass M with an arbitrary frequency can be expressed by a sine wave. An arbitrary frequency component of the first reference value a, which is the velocity of the mass M, can be expressed by a sine wave. For example, in a case where an arbitrary frequency component of the first reference value a is expressed as sin ωt (ω being an angular frequency, t being time), integration of the same results in $-(1/\omega)\cos \omega t$. Comparing the amplitude of the first reference value a with the amplitude of the integrated value, the amplitude of the integrated value is $1/\omega$ times the first reference value a.

Therefore, in a case where the second reference value b is equivalent to the integrated value of the first reference value a, it is possible to cause the first reference value a and the second reference value b to have the same amplitude by multiplying a value equivalent to the integrated value of the first reference value a by ω, i.e., the angular frequency ω that matches the frequency extracted using a filter. On the other hand, in a case where the second reference value b is equivalent to the differential value of the first reference value a, it is possible to cause the first reference value a and the second reference value b to have the same amplitude by multiplying a value equivalent to the differential value of the first reference value a by $1/\omega$. As set forth above, in order to cause the first reference value a and the second reference value b to have the same amplitude, the second reference value b is adjusted as follows in the course of obtainment of a vibration level. In a case where the second reference value b is equivalent to the integrated value of the first reference value a, a value equivalent to the integrated value is multiplied by $\omega$, i.e., the angular frequency $\omega$ of vibration targeted for detection. In a case where the second reference value b is equivalent to the differential value of the first reference value a, a value equivalent to the differential value is multiplied by $1/\omega$.

Figure 4:
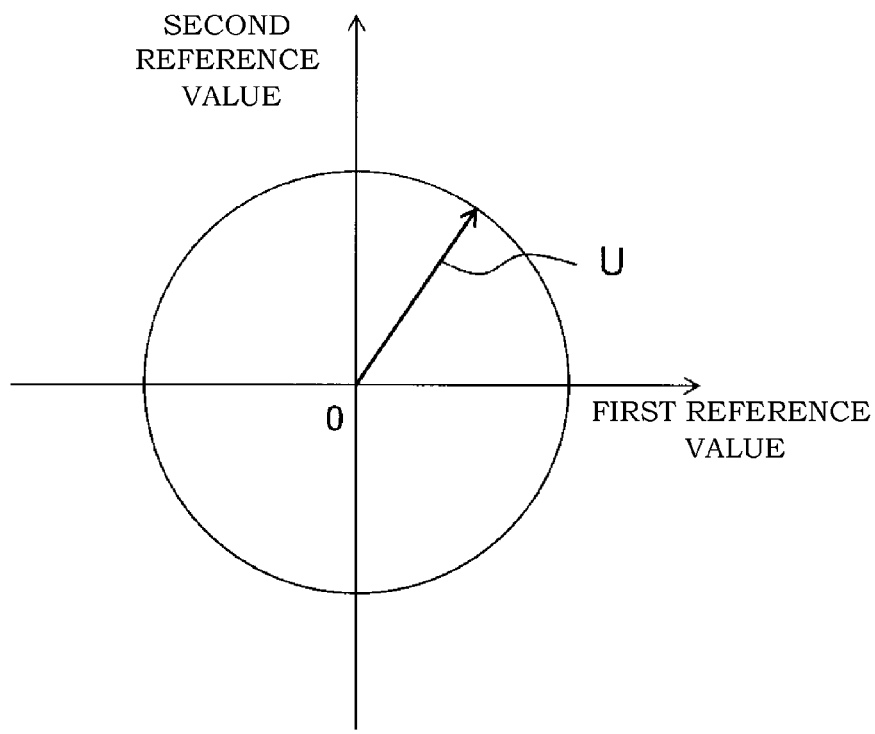
FIG. 4 is an explanatory diagram showing a synthetic vector of first and second reference values.

Subsequently, the first reference value a and the second reference value b processed in the above-described manner are plotted as orthogonal coordinates as shown in FIG. 4, and the length of a synthetic vector U of these first reference value a and second reference value b is calculated as a vibration level L. The length of the synthetic vector U is calculated as $(a^2+b^2)^{1/2}$. However, $(a^2+b^2)$ with omission of root calculation, that is to say, a value of a square of the length of the synthetic vector U may be regarded as a value that enables determination of the length of the synthetic vector U and be used as the vibration level L. In this way, high-load root calculation can be avoided, and calculation time can be shortened. Also, a value obtained by raising the length of the synthetic vector U to the $z^{th}$ power (z being an arbitrary value), as well as a value obtained by multiplying this length by an arbitrary coefficient, makes the length of the synthetic vector U recognizable and therefore may be used as a vibration level, although it does not directly match the length of the synthetic vector U. That is to say, it is sufficient to use a value that makes the length of the synthetic vector U recognizable as a vibration level L.

Here, if vibration is applied to the mass M by moving the base T upward and downward or by releasing the mass M after displacing the mass M, the spring S extends and compresses, and the elastic energy of the spring S and the kinetic energy of the mass M are converted alternately. Therefore, in a case where there is no disturbance, the mass M has a zero velocity when the displacement thereof from a neutral position is maximized, and the mass M has a maximum velocity at the neutral position. It should be noted that the mass M is at the neutral position when it is in a stationary state while being elastically supported by the spring S.

Through the adjustment of the above-described procedure, the first reference value a and the second reference value b have the same amplitude, and are out of phase from each other by 90 degrees. Therefore, if vibration of the mass M does not damp down and the same vibration is repeated, an ideal trajectory of the first reference value a and the second reference value b draws a circle as shown in FIG. 4. The vibration level L is equal to the radius of this circle. It should be noted that, in reality, the first reference value a and the second reference value b may not be able to have completely matching amplitudes due to the extraction accuracy of a filter, disturbance acting on the mass M, noise included in the first reference value a and the second reference value b, and the like. However, the value of the vibration level L is substantially equal to the radius of the above-described circle.

As set forth above, regarding the vibration level L, the second reference value b representing the displacement has a maximum absolute value even if the first reference value a representing the velocity is zero. Conversely, the first reference value a has a maximum absolute value even if the second reference value b is zero. In this way, the vibration level L has a constant value in a case where the condition of vibration of the mass M does not change. That is to say, the vibration level L is an index value indicating the extent of the amplitude at which the mass M is vibrating, and represents a magnitude of vibration. The vibration level L can be obtained on the basis of the displacement and velocity of the mass M without obtaining a wave height through sampling of one of the displacement, velocity, and acceleration of the mass M corresponding to one cycle. Therefore, the vibration level L can be obtained timely. The above-described detection of a vibration level enables timely and real-time detection of a magnitude of vibration of the mass M.

It should be noted that the vibration level L may be obtained under the assumption that the first reference value a and the second reference value b are the velocity and acceleration of the mass M, the acceleration and a change ratio of the acceleration, and the displacement and a value equivalent to an integrated value of the displacement. In this case also, the first reference value a and the second reference value b are out of phase with each other by 90 degrees, and the second reference value b is adjusted using the angular frequency $\omega$ of vibration that is desired to be detected; accordingly, a trajectory of the first reference value a and the second reference value b plotted as orthogonal coordinates draws a circle, and the vibration level L serves as an index representing a magnitude of vibration. That is to say, the vibration level L can be obtained by setting the first reference value a to one of the displacement, velocity, and acceleration of the mass M corresponding to a direction of vibration that is desired to be detected, and setting the second reference value b to a value equivalent to an integrated value or a differential value of the first reference value a.

The first reference value a may be obtained by differentiating or integrating the output of a sensor, instead of obtaining the same directly from the sensor. The second reference value b may be obtained directly from another sensor that is separately provided, instead of obtaining the same as a value equivalent to the differential value or the integrated value of the first reference value a.

Furthermore, in a case where the second reference value b is equivalent to the integrated value of the first reference value a, it is permissible to: use a value equivalent to the differential value of the first reference value a as a third reference value c; obtain, as a first vibration level L1, a value equivalent to a vibration level from the first reference value a and the second reference value b through the above-described procedure; and obtain, as a second vibration level L2, a value equivalent to a vibration level from the first reference value a and the third reference value c through the above-described procedure by using the third reference value c in place of the second reference value b. In this case, an average value of the first vibration level L1 and the second vibration level L2, which is calculated by dividing a sum of the first vibration level L1 and the second vibration level L2 by two, is the vibration level L. In a case where the second reference value b is equivalent to the differential value of the first reference value a, it is sufficient to use a value equivalent to the integrated value of the first reference value a as the third reference value c.

Figure 5:
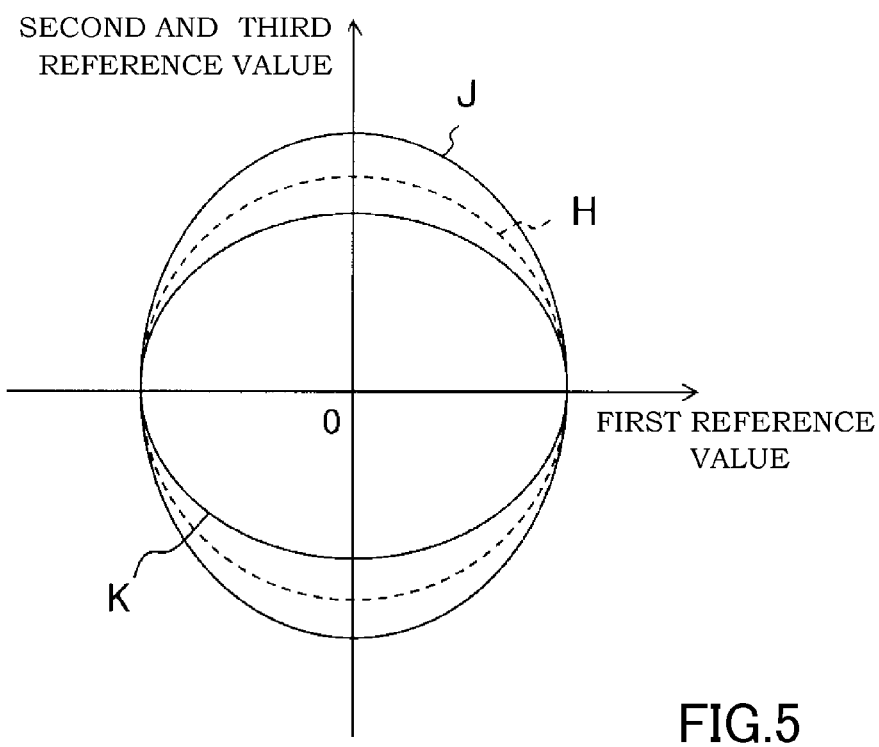
FIG. 5 is an explanatory diagram showing a trajectory of first and second reference values, and a trajectory of first and third reference values.

In this case, assume orthogonal coordinates realized by taking the first reference value a along a horizontal axis, and the second reference value b and the third reference value c along a vertical axis, as shown in FIG. 5. The first reference value a, the second reference value b, and the third reference value c are filtered using a band-pass filter in order to obtain a vibration level in a detected frequency range among vibration levels of the mass M.

However, in a case where a vibration frequency of the mass M is offset from a frequency extracted using the band-pass filter, the first vibration level L1 takes a value equal to or larger than the maximum value of the first reference value a, and a trajectory J of the first reference value a and the second reference value b forms an elliptic shape whose major axis is longer than a circle H whose radius is the maximum value of the first reference value a as indicated by a dash line in FIG. 5. The second vibration level L2 takes a value equal to or smaller than the maximum value of the first reference value a, and a trajectory K of the first reference value a and the third reference value c forms an elliptic shape whose minor axis is shorter than the circle H.

That is to say, in a case where the vibration frequency of the mass M does not match the vibration frequency that is desired to be detected, the angular frequency $\omega$ used in the adjustment of the above-described procedure is offset from an actual angular frequency $\omega'$. As a result, when the second reference value b equivalent to the integrated value of the first reference value a has been adjusted, the maximum value of the second reference value b is $\omega/\omega'$ times the maximum value of the first reference value a, and the maximum value of the third reference value c equivalent to the differential value of the first reference value a is $\omega'/\omega$ times the maximum value of the first reference value a.

As set forth above, in a case where the first vibration level L1 takes a value larger than the first reference value a, the second vibration level L2 takes a value smaller than the first reference value a in a corresponding manner. Therefore, by obtaining their average as the vibration level L, fluctuations in the vibration level L are alleviated, and the obtained vibration level L is stable even if the vibration frequency of the mass M does not match the vibration frequency that is desired to be detected. This makes it possible to detect the vibration level L with high accuracy. It is known that, in a case where the vibration level L is in waves, noise of a frequency component that is double the vibration frequency of the mass M is superimposed on the vibration level L, even if the fluctuations in the vibration level L are thus alleviated. In this case, it is sufficient to filter the vibration level L by providing a filter that removes the superimposed noise.

In the above-described example, the vibration level L is obtained using the second reference value b and the third reference value c that are equivalent to the integrated value and the differential value of the first reference value a. Alternatively, for example, it is permissible to obtain not only the vibration level L by using the displacement and the velocity as the first reference value a and the second reference value b, respectively, but also another vibration level L separately by using the acceleration and a change ratio of the acceleration as the first reference value a and the second reference value b, respectively. In this case, an average value of the vibration level L obtained from the displacement and the velocity and the vibration level L obtained from the acceleration and the change ratio of the acceleration is obtained as a final vibration level. That is to say, it is also possible to obtain a final vibration level on the basis of a plurality of vibration levels obtained from different first and second reference values.

The following is a specific description of a method for detecting the sprung vibration level LB, which is a vibration level of the vehicle body B of the vehicle, in the sprung vibration level detection unit 23.

Figure 6:
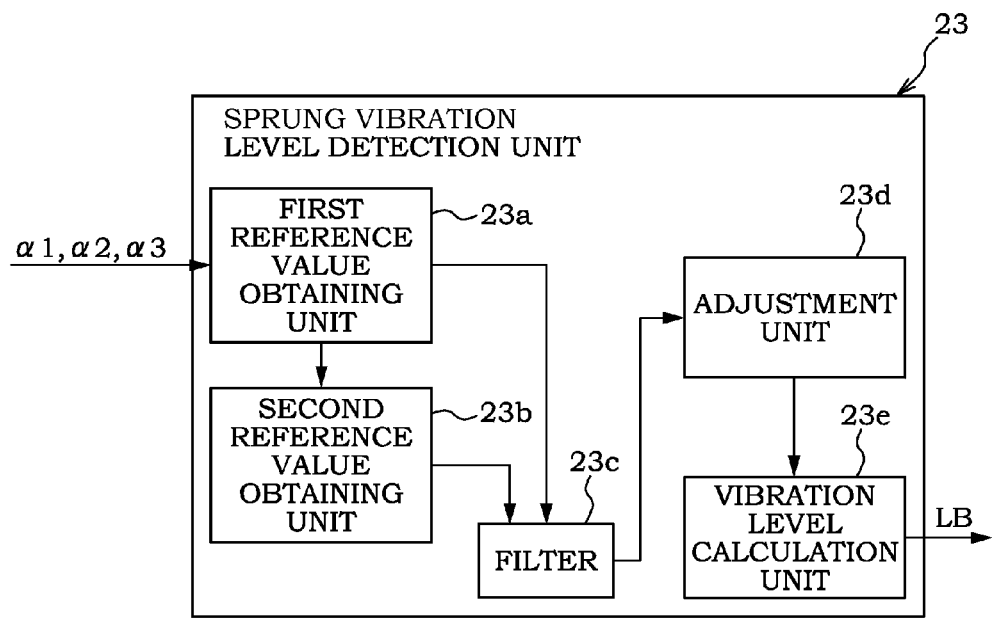
FIG. 6 shows a configuration of a sprung vibration level detection unit.

As shown in FIG. 6, the sprung vibration level detection unit 23 includes a first reference value obtaining unit 23*a*, a second reference value obtaining unit 23*b*, a filter 23*c*, an adjustment unit 23*d*, and a vibration level calculation unit 23*e*. The first reference value obtaining unit 23*a* obtains a bounce velocity Vb, a roll velocity Vr, and a pitching velocity Vp, which are the velocities of the vehicle body B in the up-down direction, rolling direction, and pitching direction, respectively. Using values obtained by the first reference value obtaining unit 23*a* as first reference values, the second reference value obtaining unit 23*b* obtains second reference values that are equivalent to differential values of the first reference values. The filter 23*c* extracts a resonant frequency component of the sprung member from the first and second reference values. The vibration level calculation unit 23*e* obtains the sprung vibration level LB.

Figure 7:
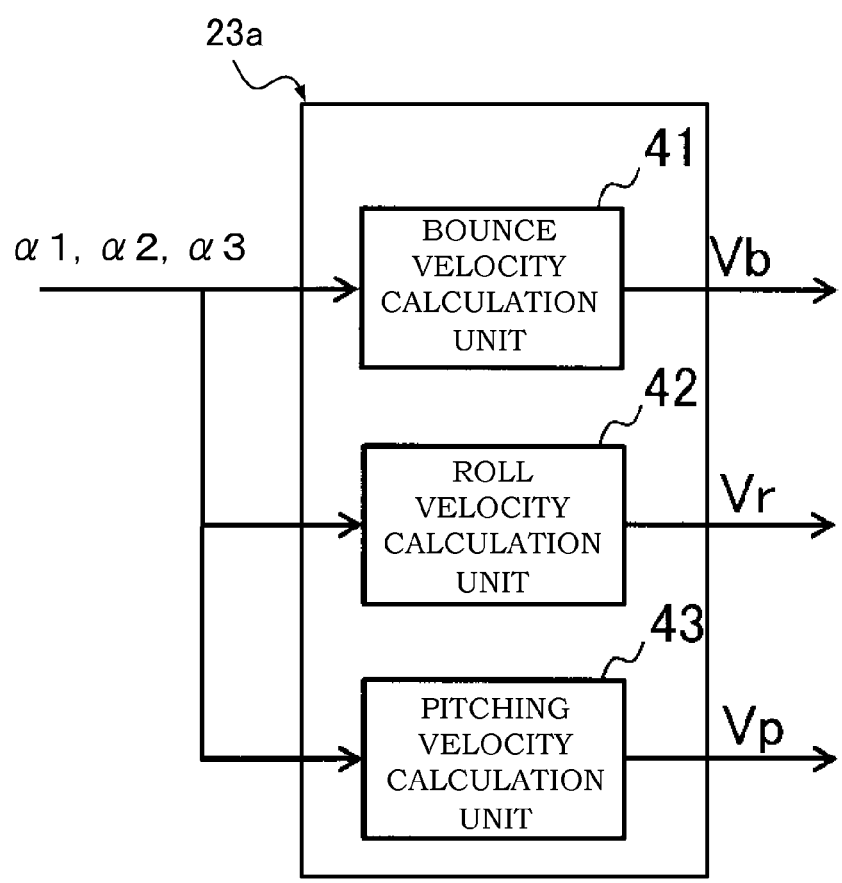
FIG. 7 shows a part of the configuration of the sprung vibration level detection unit in detail.

As shown in FIG. 7, the first reference value obtaining unit 23*a* includes a bounce velocity calculation unit 41, a roll velocity calculation unit 42, and a pitching velocity calculation unit 43 that respectively obtain the bounce velocity Vb, the roll velocity Vr, and the pitching velocity Vp from the accelerations $\alpha 1$, $\alpha 2$, $\alpha 3$ detected by the acceleration sensors 22*a*, 22*b*, 22*c*.

The acceleration sensors 22*a*, 22*b*, and 22*c* output a voltage signal corresponding to the detected accelerations $\alpha 1$, $\alpha 2$, $\alpha 3$ of the vehicle body B in the up-down direction to the bounce velocity calculation unit 41, the roll velocity calculation unit 42, and the pitching velocity calculation unit 43. The bounce velocity calculation unit 41, the roll velocity calculation unit 42, and the pitching velocity calculation unit 43 respectively calculate the bounce velocity Vb, the roll velocity Vr, and the pitching velocity Vp of the sprung member by processing the signal from the acceleration sensors 22*a*, 22*b*, 22*c*. It should be noted that the accelerations $\alpha 1$, $\alpha 2$, $\alpha 3$ have positive signs when they are upward.

The bounce velocity calculation unit 41 obtains acceleration $\alpha b$ of the sprung member in the bounce direction from the accelerations $\alpha 1$, $\alpha 2$, $\alpha 3$, obtains the bounce velocity Vb of the vehicle body B by integrating the acceleration $\alpha b$, and uses the bounce velocity Vb as a first reference value ab for obtaining a vibration level Lb in the bounce direction. The bounce velocity Vb is a velocity in the up-down direction at the center of mass of the vehicle body B.

The roll velocity calculation unit 42 obtains acceleration $\alpha r$ of the vehicle body B in the rolling direction, that is to say, angular acceleration, from the accelerations $\alpha 1$, $\alpha 2$, $\alpha 3$, obtains the roll velocity Vr by integrating the acceleration $\alpha r$, and uses the roll velocity Vr as a first reference value ar for obtaining a vibration level Lr in the rolling direction. The roll velocity Vr is the angular velocity in the rolling direction at the center of mass of the vehicle body B.

The pitching velocity calculation unit 43 obtains acceleration $\alpha p$ of the vehicle body B in the pitching direction, that is to say, angular acceleration, from the accelerations $\alpha 1$, $\alpha 2$, $\alpha 3$, obtains the pitching velocity Vp by integrating the acceleration $\alpha p$, and uses the pitching velocity Vp as a first reference value $\alpha p$ for obtaining a vibration level Lp in the pitching direction. The pitching velocity Vp is the angular velocity in the pitching direction at the center of mass of the vehicle body B.

The bounce acceleration $\alpha b$, the roll acceleration $\alpha r$, and the acceleration $\alpha p$ in the pitching direction are obtained from the accelerations $\alpha 1$, $\alpha 2$, $\alpha 3$, the positions in which the acceleration sensors 22*a*, 22*b*, 22*c* are installed, and the position of the center of mass of the vehicle body B. That is to say, under the assumption that the vehicle body B is a rigid body, upon obtainment of the accelerations $\alpha 1$, $\alpha 2$, $\alpha 3$ in the up-down direction at three arbitrary positions in the vehicle body B that are horizontally coplanar but noncollinear, the bounce velocity Vb, the roll velocity Vr, and the pitching velocity Vp at arbitrary positions in the vehicle B are uniquely determined. A similar calculation applies to displacements and accelerations. Furthermore, in order to obtain a vibration level for a case in which an object vibrates in a rotation direction, a first reference value may be a rotation angle representing a displacement of the object in the rotation direction, an angular velocity representing a velocity in the rotation direction, and angular acceleration representing acceleration in the rotation direction.

Generally, control for suppressing vibration of the vehicle body B of the vehicle in the rolling direction, pitching direction, and the bounce direction is often performed by evaluating vibration in each direction at the position of the center of mass of the vehicle body B. Therefore, it will be assumed in the present embodiment that the vibration level Lb in the bounce direction, the vibration level Lr in the rolling direction, and the vibration level Lp in the pitching direction at the position of the center of mass of the vehicle body B are obtained.

The second reference value obtaining unit 23b obtains a second reference value bb equivalent to acceleration in the bounce direction by differentiating the bounce velocity Vb, obtains a second reference value br equivalent to acceleration of the sprung member in the rolling direction by differentiating the first reference value ar representing the roll velocity Vr, and obtains a second reference value by equivalent to acceleration of the sprung member in the pitching direction by differentiating the first reference value ap representing the pitching velocity Vp. It should be noted that the second reference values bb, br, by may be used as second reference values because they are equivalent to differential values of the first reference values ab, ar, ap, and values equivalent to the second reference values bb, br, by are calculated in obtaining the bounce velocity Vb, the roll velocity Vr, and the pitching velocity Vp.

The filter 23c extracts a resonant frequency component of the vehicle body B by applying filter processing to the first reference value ab and the second reference value bb for the bounce direction, the first reference value ar and the second reference value br for the rolling direction, and the first reference value ap and the second reference value by for the pitching direction.

The adjustment unit 23d adjusts the second reference value bb for the bounce direction, the second reference value br for the rolling direction, and the second reference value by for the pitching direction using an angular frequency ω that falls in resonant frequencies of the vehicle body B.

The vibration level calculation unit 23e obtains the vibration level Lb of the vehicle body B in the bounce direction from the first reference value ab for the bounce direction and the adjusted second reference value bb for the bounce direction, using the above-described calculation method for obtaining the vibration level L of the mass M. The vibration level calculation unit 23e also obtains the vibration level Lr of the vehicle body B in the rolling direction from the first reference value ar for the rolling direction and the adjusted second reference value br for the rolling direction, using the above-described calculation method. The vibration level calculation unit 23e further obtains the vibration level Lp of the vehicle body B in the pitching direction from the first reference value ap for the pitching direction and the adjusted second reference value by for the pitching direction, using the above-described calculation method.

The sprung vibration level detection unit 23 obtains the sprung vibration level LB of the vehicle body B by adding the vibration level Lb in the bounce direction, the vibration level Lr in the rolling direction, and the vibration level Lp in the pitching direction. The vibration level Lr in the rolling direction and the vibration level Lp in the pitching direction are vibration levels in the rotation direction at the position of the center of mass of the vehicle body B.

In view of this, the sprung vibration level detection unit 23 calculates an average value of roll vibration levels immediately above the four dampers D by multiplying the vibration level Lr in the rolling direction by an average value of distances in a sideways direction from the position of the center of mass of the vehicle body B to portions located immediately above the four dampers D. The sprung vibration level detection unit 23 also calculates an average value of pitching vibration levels immediately above the four dampers D by multiplying the vibration level Lp in the pitching direction by an average value of distances in a front-rear direction from the position of the center of mass of the vehicle body B to portions located immediately above the four dampers D.

The sprung vibration level detection unit 23 obtains the sprung vibration level LB by adding these average values to the vibration level Lb in the bounce direction. It should be noted that the average value of distances in the sideways direction is obtained by averaging a value of a half of a front-wheel track and a value of a half of a rear-wheel track. However, if they do not significantly differ from each other, one of the values may be used. It should also be noted that the average value of distances in the front-rear direction is obtained by averaging a distance in the front-rear direction between a front-wheel position and the position of the center of mass and a distance in the front-rear direction between a rear-wheel position and the position of the center of mass. However, if they do not significantly differ from each other, one of the values may be used. The sprung vibration level LB thus obtained is input to the determination unit 25.

Figure 8:
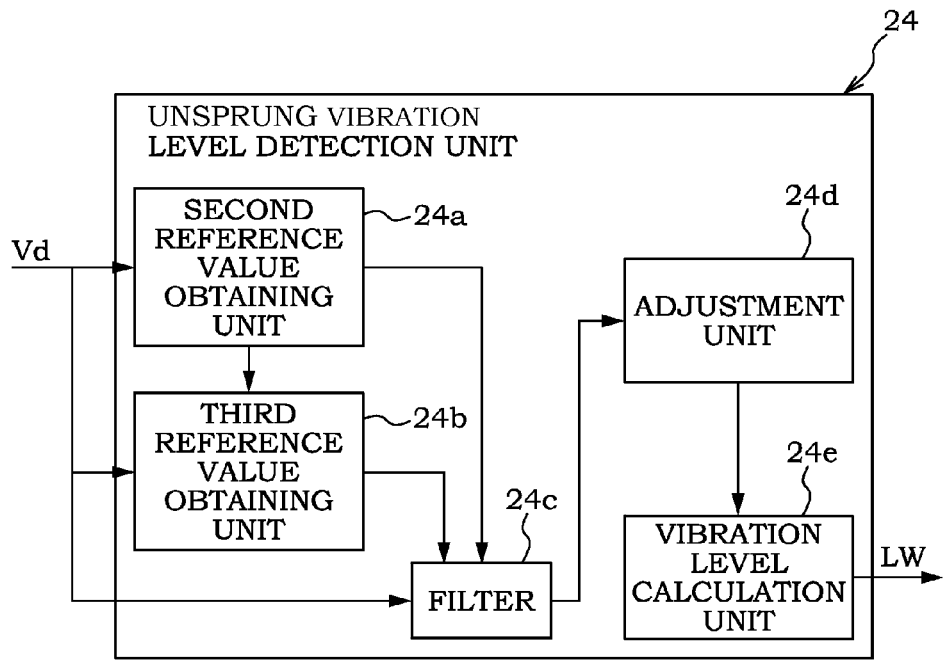
FIG. 8 shows a configuration of an unsprung vibration level detection unit.

As shown in FIG. 8, the unsprung vibration level detection unit 24 includes a second reference value obtaining unit 24a, a third reference value obtaining unit 24b, a filter 24c, an adjustment unit 24d, and a vibration level calculation unit 24e. Using a stroke velocity Vd of a damper D obtained from the stroke velocity calculation unit 21 as a first reference value, the second reference value obtaining unit 24a obtains a second reference value equivalent to a differential value of the first reference value. The third reference value obtaining unit 24b obtains a third reference value equivalent to an integrated value of the first reference value. The filter 24c extracts a resonant frequency component of an unsprung member from the first, second, and third reference values. The vibration level calculation unit 24e obtains an unsprung vibration level LW, which represents a magnitude of vibration of a vehicle wheel W.

It should be noted that the unsprung vibration level detection unit 24 does not include a first reference value obtaining unit because the damper control device E is provided with the stroke velocity calculation unit 21 and a stroke velocity Vd obtained by the stroke velocity calculation unit 21 is used as a first reference value. However, in a case where the acceleration, velocity, and displacement of the vehicle wheel W in the up-down direction are directly detected as a first reference value using a sensor attached to the vehicle wheel W, the unsprung vibration level detection unit 24 may include a first reference value obtaining unit that obtains the acceleration, velocity, and displacement of the vehicle wheel W in the up-down direction as a first reference value.

The second reference value obtaining unit 24a obtains stroke acceleration αd of the damper D by differentiating the first reference value representing the stroke velocity Vd of the damper D. The third reference value obtaining unit 24b obtains a damper displacement Xd representing a stroke displacement of the damper D by integrating the first reference value representing the stroke velocity Vd, and uses the damper displacement Xd as the third reference value. It should be noted that, as the damper displacement Xd is detected by a stroke sensor 20, the detected damper displacement Xd may be used as the third reference value as-is.

The filter 24c extracts only a frequency component of the vehicle wheel W in a resonant frequency range included in the stroke velocity Vd, stroke acceleration ad, and damper displacement Xd of the damper D by filtering the stroke velocity Vd, stroke acceleration ad, and damper displacement Xd, which are respectively the first, second, and third reference values.

It is sufficient to obtain the displacement, velocity, and acceleration of the vehicle wheel W. Therefore, in a case where the second and third reference values are obtained by differentiating and integrating the first reference value, processing of the filter 24c may be applied only to the damper displacement Xd prior to obtainment of the first reference value. That is to say, filter processing may be applied directly to the output of a stroke sensor 20, and may be applied only to the first reference value prior to obtainment of the second and third reference values.

The adjustment unit 24d adjusts the first, second, and third reference values thus obtained using an angular frequency ω that falls in resonant frequencies of the vehicle wheel W.

The vibration level calculation unit 24e obtains a first vibration level LW1 from the first and second reference values, and a second vibration level LW2 from the first and third reference values. The vibration level calculation unit 24e obtains an average value of the first vibration level LW1 and the second vibration level LW2 as an unsprung vibration level LW of the vehicle wheel W. It should be noted that the unsprung vibration level LW may be obtained from the first and second reference values without providing the third reference value obtaining unit 24b. However, by obtaining the unsprung vibration level LW with the third reference value obtaining unit 24b, the unsprung vibration level LW can be detected with higher accuracy. The unsprung vibration level LW is input to the bad wavy road control calculation unit 2 and the final instruction calculation unit 3.

The determination unit 25 determines that the road surface on which the vehicle is running is a wavy road if the sprung vibration level LB is equal to or higher than a predetermined sprung vibration level threshold, and determines that the road surface is not a wavy road if the sprung vibration level LB is lower than the sprung vibration level threshold. That is to say, the determination unit 25 determines that the road surface is a wavy road if the vehicle body B is undergoing large vibration. It should be noted that, in the determination by the determination unit 25, the sprung vibration level LB is corrected in accordance with a vehicle speed.

Figure 9:
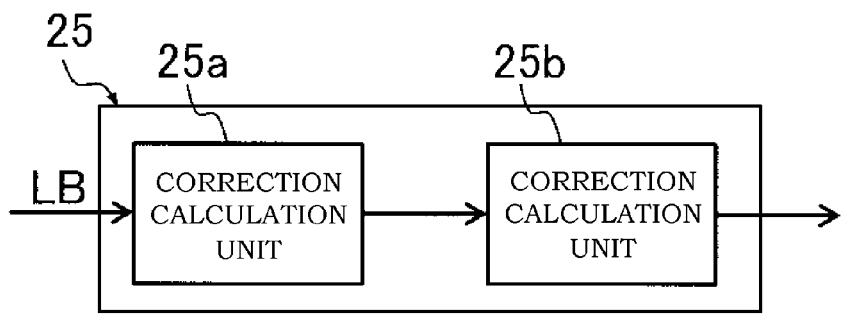
FIG. 9 shows a configuration of a determination unit.

As shown in FIG. 9, the determination unit 25 includes a correction calculation unit 25a and a determination calculation unit 25b. The correction calculation unit 25a obtains a correction coefficient on the basis of the vehicle speed, and corrects the sprung vibration level LB by multiplying the sprung vibration level LB by the correction coefficient. The determination calculation unit 25b makes the aforementioned determination by comparing the corrected sprung vibration level LB with the sprung vibration level threshold. The determination unit 25 corrects the sprung vibration level LB by multiplying the sprung vibration level LB by a correction coefficient that increases as a vehicle speed increases, and determines whether or not the vehicle is running on a wavy road on the basis of whether or not the corrected sprung vibration level LB is equal to or higher than the sprung vibration level threshold. In this way, the higher the vehicle speed, the smaller the sprung vibration level threshold. This makes it easy to determine that the vehicle is running on a wavy road, even if the vehicle body B is undergoing small vibration. In a case where the vehicle speed is high, it is possible to give a sense of safety to a passenger by causing the dampers D to exert a damping force suitable for a wavy road so as to improve the road surface tracking property of the vehicle body B. Therefore, by making it easy to determine that the vehicle is running on a wavy road, ride quality of the vehicle can be improved.

Figure 21:
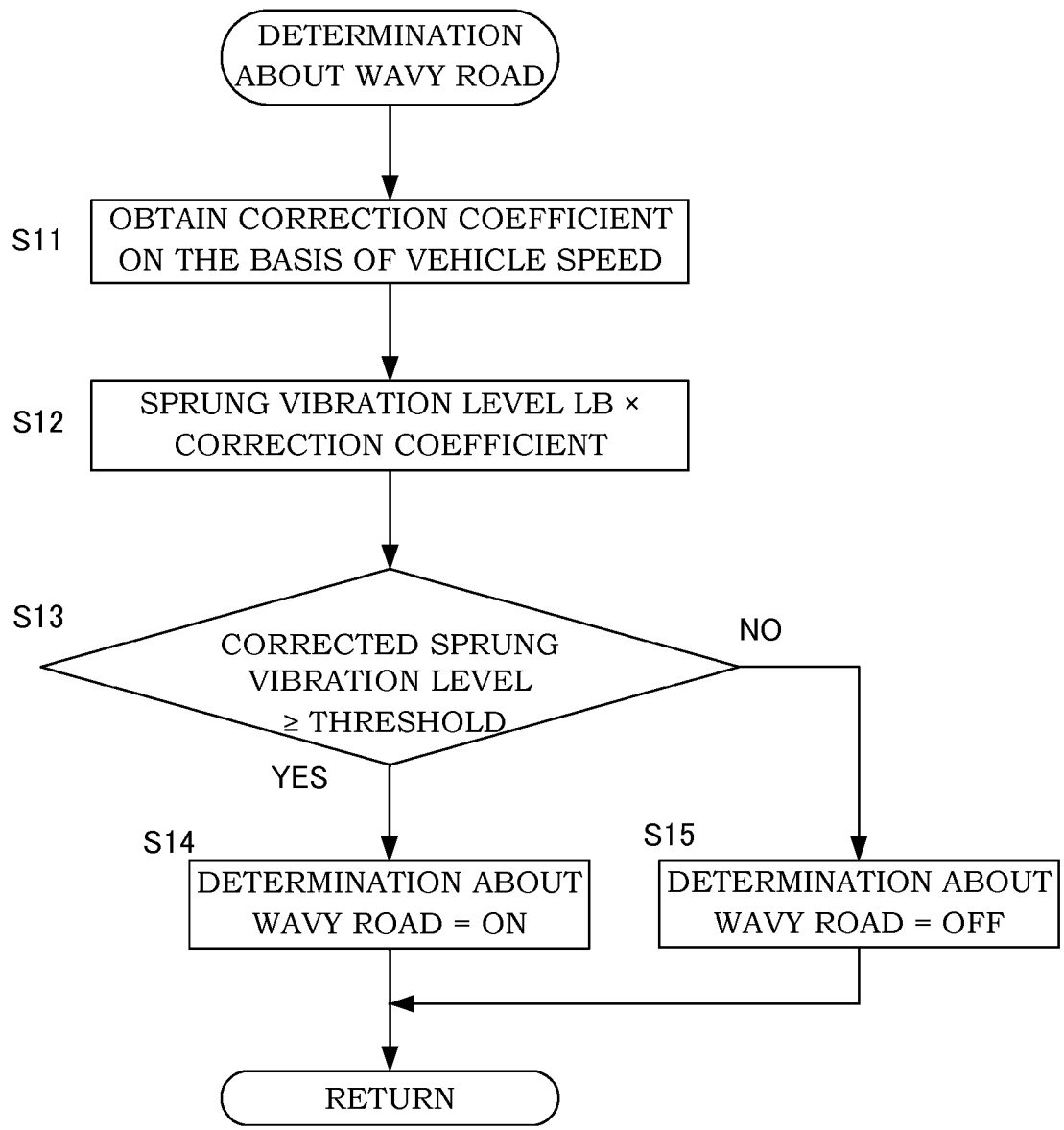
FIG. 21 is a flowchart showing processing of determination of a wavy road, which is executed in step S3 of FIG. 20.

FIG. 21 is a flowchart showing processing of determination of a wavy road, which is executed in step S3 of FIG. 20. In step S11, the damper control device E obtains a correction coefficient on the basis of a vehicle speed. In step S12, the damper control device E corrects the sprung vibration level LB by multiplying the sprung vibration level LB by the correction coefficient obtained in step S11. In step S13, the damper control device E compares the corrected sprung vibration level with a predetermined threshold. If the corrected sprung vibration level is equal to or higher than the threshold, processing proceeds to step S14, and it is determined that the vehicle is running on a wavy road. If the corrected sprung vibration level is lower than the threshold, processing proceeds to step S15, and it is determined that the vehicle is not running on a wavy road.

If such correction is not necessary, the correction calculation unit 25a may be eliminated from the configuration of the determination unit 25. Although the determination unit 25 determines whether or not the vehicle is running on a wavy road using the sprung vibration level LB as a parameter, it may determine whether or not the vehicle is running on a wavy road using a parameter other than the sprung vibration level LB, such as the acceleration, velocity, and displacement of the vehicle body B in the up-down direction. It should be noted that, as the sprung vibration level LB represents a magnitude of vibration of the vehicle body B, whether or not the vehicle body B is undergoing large vibration can be detected with high accuracy when the sprung vibration level LB is used as a parameter. For example, in a case where the velocity of the vehicle body B is used as a parameter in determining whether or not the vibration of the vehicle body B is large, the vehicle body B has a zero velocity when the displacement of the vehicle body B is maximized, and the velocity of the vehicle body B is maximized when the vehicle body B is at the center of vibration, even if the vibration of the vehicle body B itself is large. This makes it difficult to detect the magnitude of the vibration of the vehicle body B with high accuracy. For this reason, the magnitude of the vibration of the vehicle body B can be determined accurately by using the sprung vibration level LB.

Figure 10:
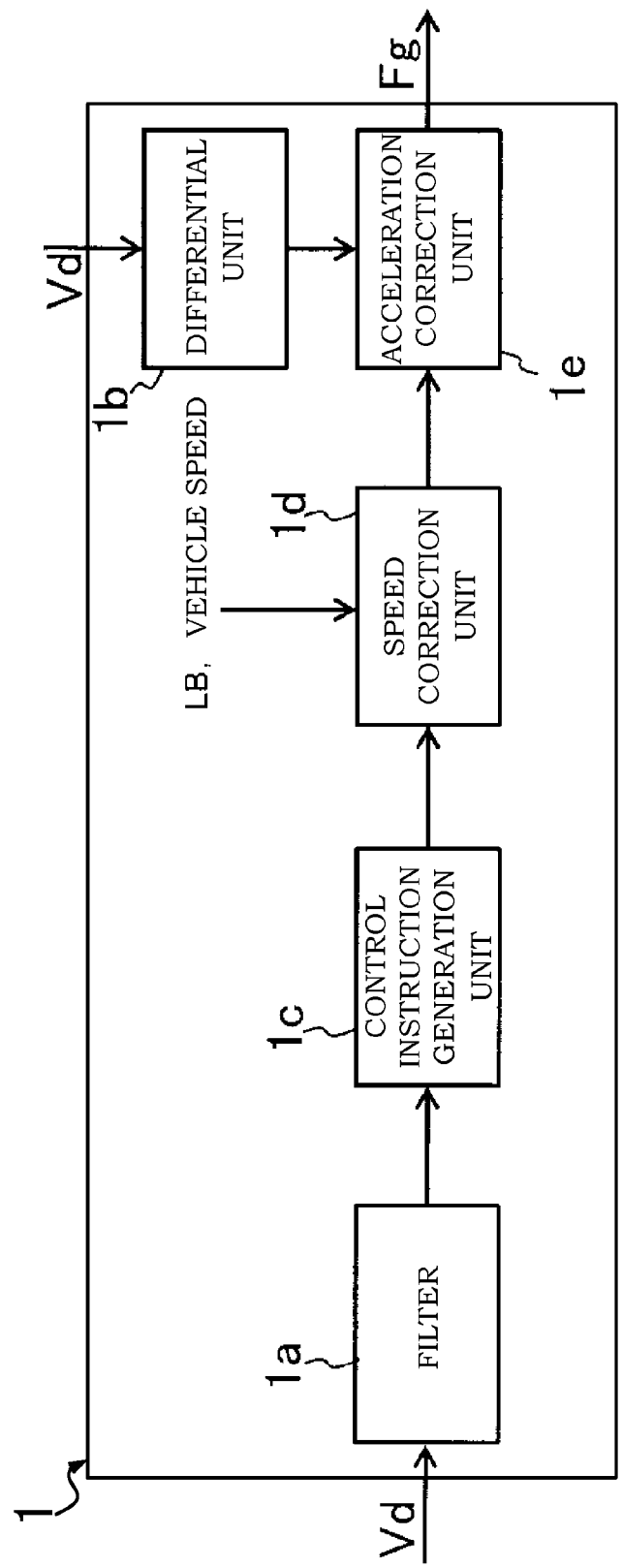
FIG. 10 shows a configuration of a good wavy road calculation unit.

As shown in FIG. 10, the good wavy road control calculation unit 1 shown in FIG. 1 includes a filter 1a, a differential unit 1b, a control instruction generation unit 1c, a speed correction unit 1d, and an acceleration correction unit 1e. Upon receiving, as input, a stroke velocity Vd of a damper D obtained by the stroke velocity calculation unit 21, the filter 1a extracts a low-frequency damper velocity VLow, which is a low-frequency component of the stroke velocity Vd. Upon receiving, as input, the stroke velocity Vd of the damper D, the differential unit 1b obtains stroke acceleration ad, which is a change ratio of the stroke velocity Vd. The control instruction generation unit 1c obtains a good wavy road control instruction Fg, which is a target damping force for a good wavy road, on the basis of the low-frequency damper velocity VLow extracted by the low-pass filter 1a. The speed correction unit 1d corrects the good wavy road control instruction Fg on the basis of the sprung vibration level LB corrected by the correction calculation unit 25a of the determination unit 25 and on a vehicle speed. The acceleration correction unit 1e corrects the good wavy road control instruction Fg on the basis of the stroke acceleration ad of the damper D.

The filter 1a obtains a low-frequency damper velocity VLow by extracting a low-frequency component that is included in the stroke velocity Vd of the damper D and includes a resonant frequency range of the vehicle body B. The filter 1a is, for example, a low-pass filter with a cutoff frequency slightly higher than resonant frequencies of the vehicle body B elastically supported by suspension springs VS. It should be noted that the filter 1a may be a band-pass filter that allows transmission of a component in the resonant frequency range of the vehicle body B.

The differential unit 1b obtains the stroke acceleration αd by differentiating the stroke velocity Vd. The differential unit 1b may perform a pseudo differential calculation by executing bypass filter processing.

The control instruction generation unit 1c has a predetermined map showing a relationship between a low-frequency damper velocity VLow and a target damping force for a good wavy road. The control instruction generation unit 1c obtains a target damping force by performing a map calculation based on the low-frequency damper velocity VLow using the map, and outputs the target damping force as a good wavy road control instruction Fg. The map can be designed in an arbitrary manner.

Figure 11:
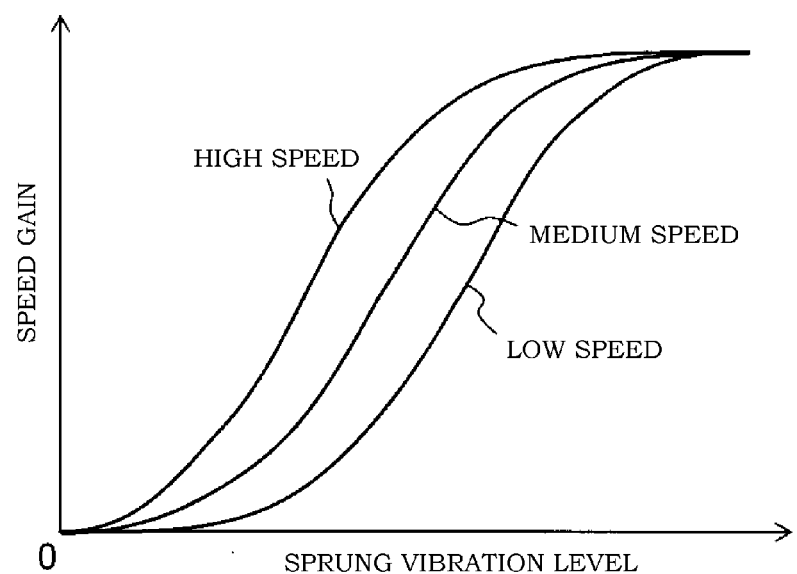
FIG. 11 shows speed gain maps in a speed correction unit.

The speed correction unit 1d corrects the good wavy road control instruction Fg output by the control instruction generation unit 1c on the basis of the sprung vibration level LB corrected by the correction calculation unit 25a and on the vehicle speed. In accordance with the vehicle speed, the speed correction unit 1d selects one of three speed gain maps that have been prepared in advance. As shown in FIG. 11, three speed gain maps are prepared in correspondence with vehicle speeds, i.e., a low speed, a medium speed, and a high speed. Each of the speed gain maps is obtained by mapping a relationship between the sprung vibration level LB and a speed gain. Provided that the sprung vibration level LB is the same, the speed gain has a minimum value when the speed gain map corresponding to the low speed is selected, and the speed gain is maximized when the speed gain corresponding to the high speed is selected.

The speed correction unit 1d corrects the good wavy road control instruction Fg by multiplying the good wavy road control instruction Fg by the speed gain. Even if the sprung vibration level LB has the same value, the good wavy road control instruction Fg is larger when the vehicle speed is high than when the vehicle speed is low. Therefore, if the good wavy road control instruction Fg is enabled by the final instruction calculation unit 3 described later, a damping force generated by the damper D is larger when the vehicle speed is high than when the vehicle speed is low, thereby contributing to a stable orientation of the vehicle body of the vehicle. It should be noted that the speed correction unit 1d, which makes the good wavy road control instruction Fg susceptible to the vehicle speed, may be eliminated if it is not necessary.

The acceleration correction unit 1e corrects the good wavy road control instruction Fg on the basis of the stroke acceleration αd obtained by the differential unit 1b. The acceleration correction unit 1e obtains an acceleration gain whose value decreases as the stroke acceleration ad increases, and corrects the good wavy road control instruction Fg by multiplying the good wavy road control instruction Fg by the acceleration gain. The good wavy road control instruction Fg is smaller when the stroke acceleration αd is large than when the stroke acceleration αd is small. Therefore, if the good wavy road control instruction Fg is enabled by the final instruction calculation unit 3 described later, a damping force generated by the damper D is smaller when the stroke acceleration αd is large than when the stroke acceleration αd is small. As a result, a sudden change in the damping force of the damper D is alleviated, and degradation in the ride quality of the vehicle can be prevented. It should be noted that the acceleration correction unit 1e, which makes the good wavy road control instruction Fg susceptible to the stroke acceleration ad, may be eliminated if it is not necessary.

Figure 22:
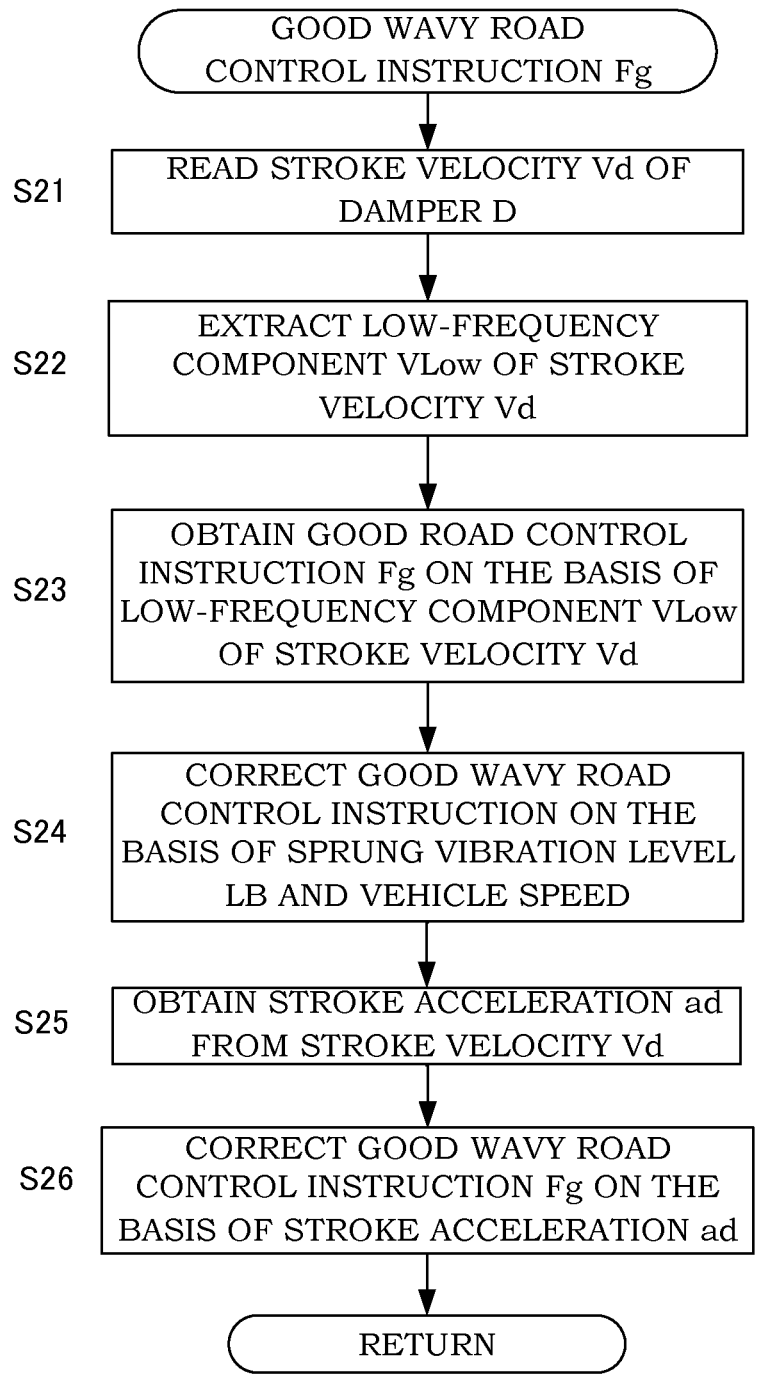
FIG. 22 is a flowchart showing processing for calculating a good wavy road control instruction Fg, which is executed in step S6 of FIG. 20.

FIG. 22 is a flowchart showing processing for calculating a good wavy road control instruction Fg, which is executed in step S6 of FIG. 20. In step S21, the damper control device E reads a stroke velocity Vd of a damper D. In step S22, the damper control device E obtains a low-frequency damper velocity VLow by applying filter processing to the stroke velocity Vd read in step S21. In step S23, the damper control device E obtains a good wavy road control instruction Fg from a map showing a relationship between the low-frequency damper velocity VLow and a target damping force for a good wavy road. In step S24, the damper control device E obtains a speed gain from a speed gain map showing a relationship between the sprung vibration level LB and a vehicle speed, and corrects the good wavy road control instruction Fg by multiplying the good wavy road control instruction Fg by the speed gain. In step S25, the damper control device E obtains stroke acceleration ad by differentiating the stroke velocity Vd. In step S26, the damper control device E obtains an acceleration gain on the basis of the stroke acceleration ad obtained in step S25, and corrects the good wavy road control instruction by multiplying the good wavy road control instruction by the acceleration gain.

Figure 12:
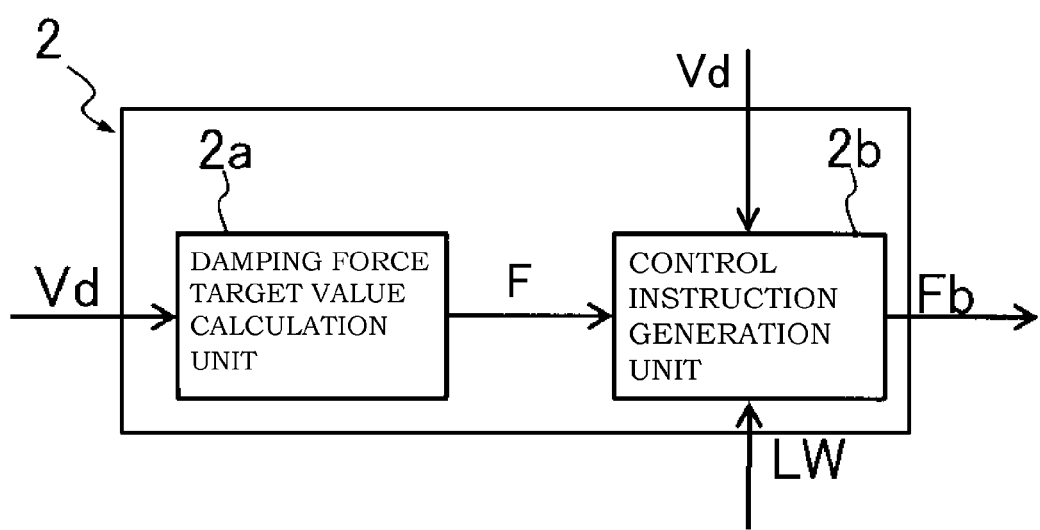
FIG. 12 shows a configuration of a bad wavy road calculation unit.

As shown in FIG. 12, the bad wavy road control calculation unit 2 shown in FIG. 1 includes a damping force target value calculation unit 2a and a control instruction generation unit 2b. The damping force target value calculation unit 2a obtains a damping force target value from a damping property suitable for control of vibration of an unsprung member, and from a stroke velocity Vd of a damper D. The damping property is prepared in advance. The control instruction generation unit 2b obtains a bad wavy road control instruction Fb by correcting the damping force target value F of the damper D on the basis of a low-frequency damper velocity VLow, which is a low-frequency component of the stroke velocity Vd.

Figure 13:
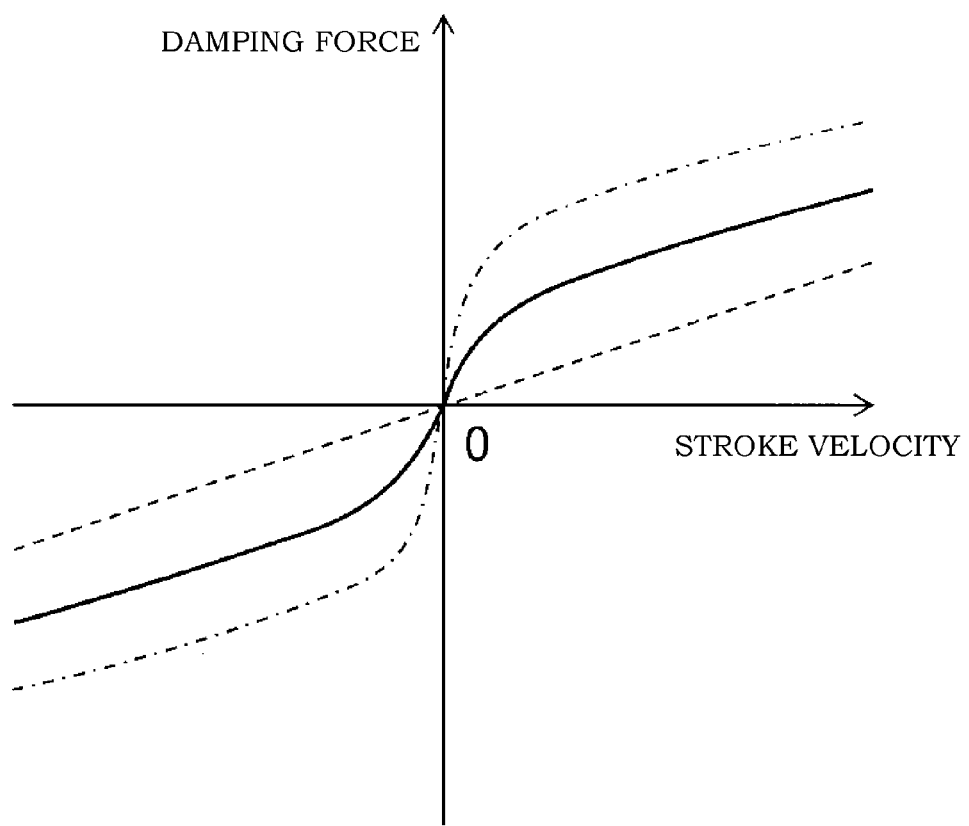
FIG. 13 shows a damping property of dampers.

The damping force target value calculation unit 2a obtains a target damping force from the damping property prepared in advance, and from the stroke velocity Vd obtained by the stroke velocity calculation unit 21. With reference to a damping property map shown in FIG. 13, the damping force target value calculation unit 2a obtains a damping force corresponding to a current stroke velocity Vd as a damping force target value F. The damping property shown in FIG. 13 indicates a damping force suitable for suppression of vibration of the unsprung member in relation to a stroke velocity Vd. It should be noted that, in FIG. 13, a dash line indicates a lower output limit of a damping force of the damper D, whereas a dash-and-dot line indicates an upper output limit of a damping force of the damper D. The damper D can change a damping force in a range from the lower output limit to the upper output limit. Also, it is permissible to prepare three types of damping properties, e.g., soft, medium, and hard damping properties, select an optimal damping property in accordance with a magnitude of the unsprung vibration level LW, and obtain the damping force target value F using the selected damping property. By thus selecting a damping property, the effects of suppression of vibration of a vehicle wheel W can be enhanced. A damping property may be, for example, selected on the basis of a parameter other than the unsprung vibration level LW, such as the stroke velocity Vd.

Figure 14:
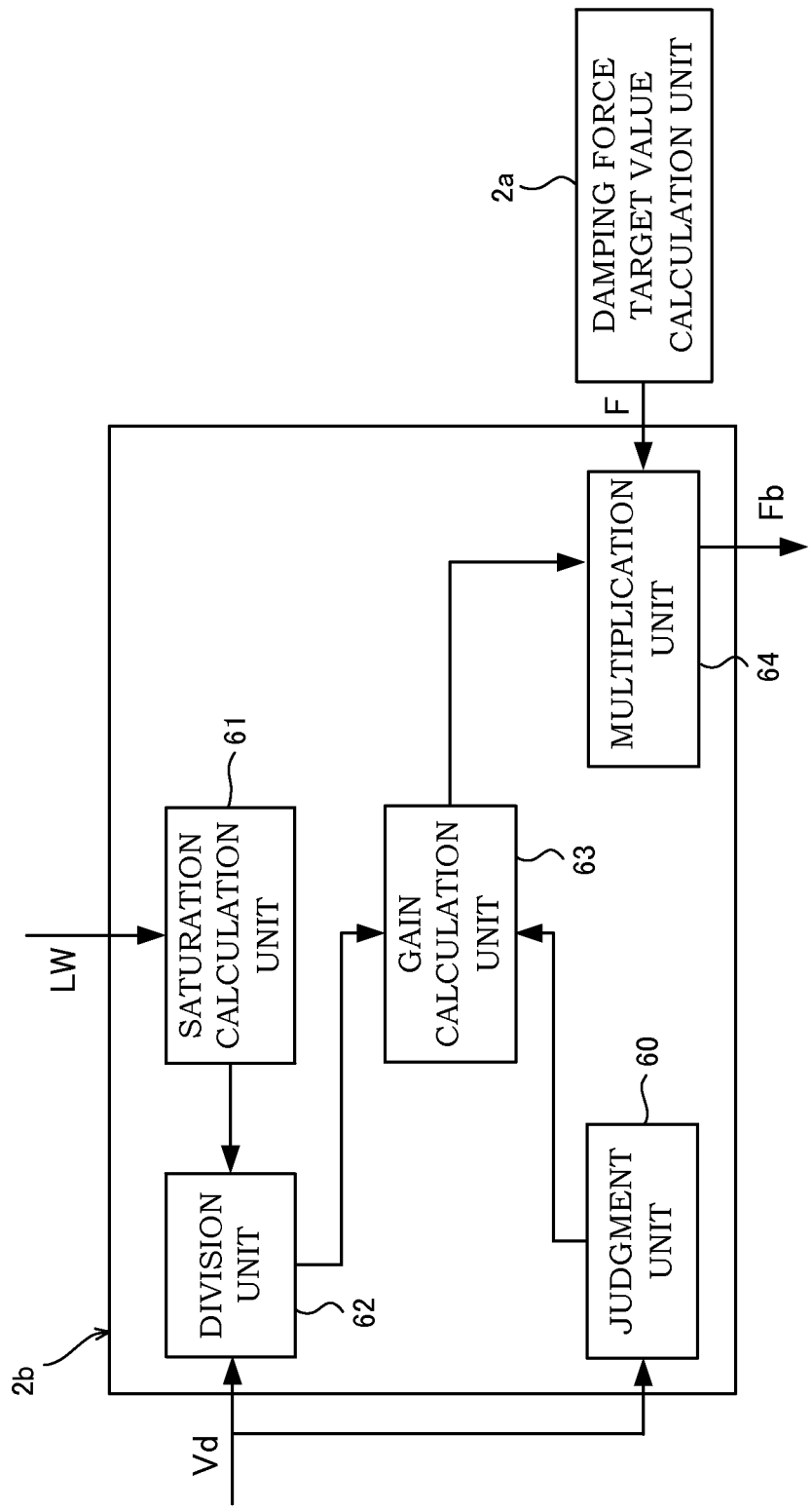
FIG. 14 shows a configuration of the bad wavy road calculation unit.

As shown in FIG. 14, the control instruction generation unit 2b includes a judgment unit 60, a saturation calculation unit 61, a division unit 62, a gain calculation unit 63, and a multiplication unit 64. The judgment unit 60 judges whether or not a damper D can exert a damping force that suppresses the low-frequency damper velocity VLow. The saturation calculation unit 61 causes a value of the unsprung vibration level LW to be saturated if the unsprung vibration level LW exceeds an upper limit value or goes below a lower limit value. Upon receiving a stroke velocity Vd and the unsprung vibration level LW as input, the division unit 62 divides the stroke velocity Vd by the unsprung vibration level LW. On the basis of the result from the division unit 62 and of the result of judgment by the judgment unit 60, the gain calculation unit 63 obtains a correction gain G by which a damping property is multiplied. The multiplication unit 64 obtains a bad wavy road control instruction Fb, which is a final damping force target value in bad wavy road control, by multiplying the damping force target value F by the correction gain G.

On the basis of the low-frequency damper velocity VLow and on vibration information of the damper D, the judgment unit 60 judges whether or not the damper D can exert a damping force that suppresses a sprung resonant frequency component of the stroke velocity Vd. It is sufficient for the vibration information of the damper D to be information that indicates a direction of a current damping force.

Therefore, the judgment unit 60 obtains a direction of the stroke velocity Vd of the damper D and a direction of the low-frequency damper velocity VLow, which is a low-frequency component of the stroke velocity Vd. Upon receiving the stroke velocity Vd as input from the stroke velocity calculation unit 21, the judgment unit 60 obtains a low-frequency component of the stroke velocity Vd by executing processing for obtaining the low-frequency damper velocity VLow, which is the low-frequency component of the stroke velocity Vd. This processing is the same as the processing of the filter 1a of the good wavy road control calculation unit 1, and therefore may be executed by the filter 1a.

Furthermore, as it is sufficient for the vibration information of the damper D to be information that indicates a direction of a current damping force, it is sufficient for the vibration information of the damper D to be information such as the stroke velocity Vd and displacement of the damper D, and pressure in the pressure chambers 15, 16. Such information may be obtained directly from a sensor that senses a condition of vibration of the damper D, and may be obtained from a control device that is higher in level than the damper control device E if such a control device exists. In this case, as the damper control device E obtains the stroke velocity Vd, it is not necessary to separately provide a sensor for obtaining the vibration information of the damper D as long as the stroke velocity Vd obtained by the stroke velocity calculation unit 21 is input to the judgment unit 60, or the displacement of the damper D obtained by a stroke sensor 20 is input to the judgment unit 60, as the vibration information of the damper D as shown in FIG. 1.

The judgment unit 60 judges whether or not the damper D can exert a damping force that suppresses the low-frequency damper velocity VLow. Specifically, the judgment unit 60 judges whether or not a direction of the low-frequency damper velocity VLow matches a direction of extension/compression of the damper D. For example, in a case where the low-frequency damper velocity VLow and the stroke velocity Vd are used, provided that an upward velocity among low-frequency damper velocities VLow in different directions is positive and a stroke velocity Vd along the extension of the damper D is positive, it is judged that the damper D can exert a damping force that suppresses the low-frequency damper velocity VLow on the condition that the sign of the low-frequency damper velocity VLow matches the sign of the stroke velocity Vd, or on the condition that a product of the low-frequency damper velocity VLow and the stroke velocity Vd is a positive value.

It should be noted that, in a case where an upward velocity among low-frequency damper velocities VLow is positive and a stroke velocity Vd along the extension of the damper D is negative, or in a case where an upward velocity among low-frequency damper velocities VLow is negative and a stroke velocity Vd along the extension of the damper D is positive, it is sufficient to judge that the damper D can exert a damping force that suppresses the low-frequency damper velocity VLow on the condition that the sign of the low-frequency damper velocity VLow does not match the sign of the stroke velocity Vd, or on the condition that a product of the low-frequency damper velocity VLow and the stroke velocity Vd is a negative value.

The saturation calculation unit 61 executes processing for restricting the unsprung vibration level LW to the lower limit value if the value thereof falls below the lower limit value, and restricting the unsprung vibration level LW to the upper limit value if the value thereof exceeds the upper limit value. For example, provided that the lower limit value and the upper limit value of the unsprung vibration level LW are 0.3 and 0.6, respectively, the value of the unsprung vibration level LW is set to 0.3 if it is smaller than 0.3, and the value of the unsprung vibration level LW is set to 0.6 if it is larger than 0.6. The value of the unsprung vibration level LW is output as-is if it is equal to or larger than 0.3, and is equal to or smaller than 0.6.

Upon receiving, as input, the stroke velocity Vd and the unsprung vibration level LW that has been output by the saturation calculation unit 61, the division unit 62 divides the stroke velocity Vd by the unsprung vibration level LW. A resultant quotient is input to the gain calculation unit 63 together with the result of judgment by the judgment unit 60. For example, in a case where the stroke velocity Vd is equal to or higher than 0.6 m/s, the unsprung vibration level LW is restricted to 0.6, and therefore the division unit 62 outputs a value equal to or larger than one. In a case where the unsprung vibration level LW is 0.6 and the stroke velocity Vd is 0.3, the division unit 62 outputs 0.5. In a case where the stroke velocity Vd is zero, the division unit 62 outputs zero. It should be noted that, as the sign of the stroke velocity Vd is inverted depending on a direction of the extension/compression of the damper D and the unsprung vibration level LW always takes a positive value, the sign of the quotient from the division unit 62 is inverted between the extension and the compression of the damper D. By thus providing the division unit 62, the stroke velocity Vd is normalized in map calculation by the gain calculation unit 63.

The gain calculation unit 63 has a gain map M1 and a gain map M2. The gain map M1 should be used in a case where the damper D can exert a damping force that suppresses the low-frequency damper velocity VLow, whereas the gain map M2 should be used in a case where the damper D cannot exert a damping force that suppresses the low-frequency damper velocity VLow. The gain calculation unit 63 selects one of the two gain maps M1, M2 on the basis of the result of judgment by the judgment unit 60, obtains an addition gain from the stroke velocity Vd/LW, and obtains a correction gain G, by which the damping force target value F should be multiplied ultimately, by adding one to the addition gain. Here, the stroke velocity Vd/LW has been normalized by the division unit 62. That is to say, the more the value of the gain diverges from one, the larger the extent at which the damping force target value F is corrected.

Figure 15:
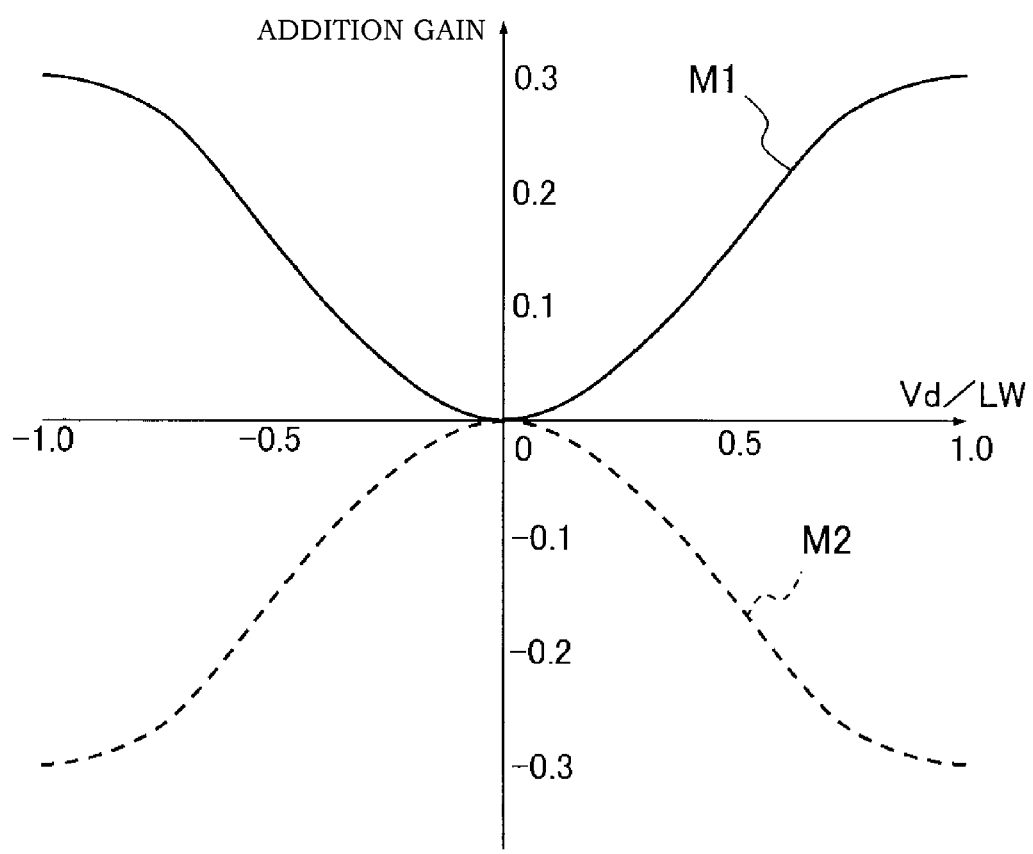
FIG. 15 shows gain maps used in the bad wavy road calculation unit.

The gain maps M1, M2 are set on a graph that takes the addition gain along a vertical axis and the normalized stroke velocity Vd/LW along a horizontal axis. As indicated by a solid line in FIG. 15, the gain map M1 is such that the addition gain takes a value from 0 to 0.3 with respect to the normalized stroke velocity Vd/LW that takes a value from −1 to 1 along the horizontal axis. As indicated by a dash line in FIG. 15, the gain map M2 is such that the addition gain takes a value from −0.3 to 0 with respect to the normalized stroke velocity Vd/LW. It should be noted that the addition gain takes a terminal value of the gain maps M1, M2, i.e., −0.3 or 0.3, in a case where the quotient from the division unit 62 is equal to or larger than 1, or is equal to or smaller than −1.

The gain calculation unit 63 outputs a result of adding one to the value of the addition gain, which has been obtained through map calculation using the gain maps M1, M2, as a correction gain G. Even if an absolute value of the stroke velocity Vd is equal to or larger than the unsprung vibration level LW, the addition gain is restricted to the lower limit value of −0.3 or the upper limit value of 0.3, and therefore the value of the correction gain G is saturated. Also, the correction gain G changes in accordance with the stroke velocity Vd of the damper D. The correction gain G increases as the stroke velocity Vd increases. It should be noted that the correction gain G may be obtained directly from the normalized stroke velocity Vd/LW by taking the correction gain G along the vertical axis of the gain maps M1, M2.

The multiplication unit 64 obtains a bad wavy road control instruction Fb, which is a final damping force target value, by multiplying the damping force target value F by the correction gain G. When the unsprung vibration level LW is high, the amplitude of the stroke velocity Vd of the vibrating damper D is also high, and hence a change ratio of the stroke velocity Vd is higher than when the unsprung vibration level LW is low. Therefore, when the unsprung vibration level LW is high, a change ratio of the damping force of the damper D becomes high, and the damping force changes significantly especially if the stroke velocity Vd is in a low-speed range, compared to when the unsprung vibration level LW is low. For this reason, if the correction gain G is decided only on the basis of the stroke velocity Vd regardless of a magnitude of the unsprung vibration level LW, there is a possibility that, in the case of a high unsprung vibration level LW, the value of the gain diverges from one so significantly that the damping force of the damper D undergoes a sudden change when the stroke velocity Vd is in the low-speed range.

In view of this, a correction gain map is prepared for each magnitude of the unsprung vibration level LW. For example, at least two correction gain maps are prepared for the unsprung vibration level LW of 0.3 and the unsprung vibration level LW of 0.6, respectively. Here, if the unsprung vibration level LW takes another value, the correction gain G is obtained by, for example, applying linear interpolation between the correction gain maps. It should be noted that the higher the unsprung vibration level LW, the higher the susceptibility to a sudden change in the damping force in the case of a large correction gain G when the stroke velocity Vd is in a low-speed range. Therefore, the correction gain G is set with respect to an arbitrary stroke velocity Vd such that, until the value of the correction gain G is saturated as described above, the higher the unsprung vibration level LW, the smaller the diversion of the value of the correction gain G from one.

Figure 23:
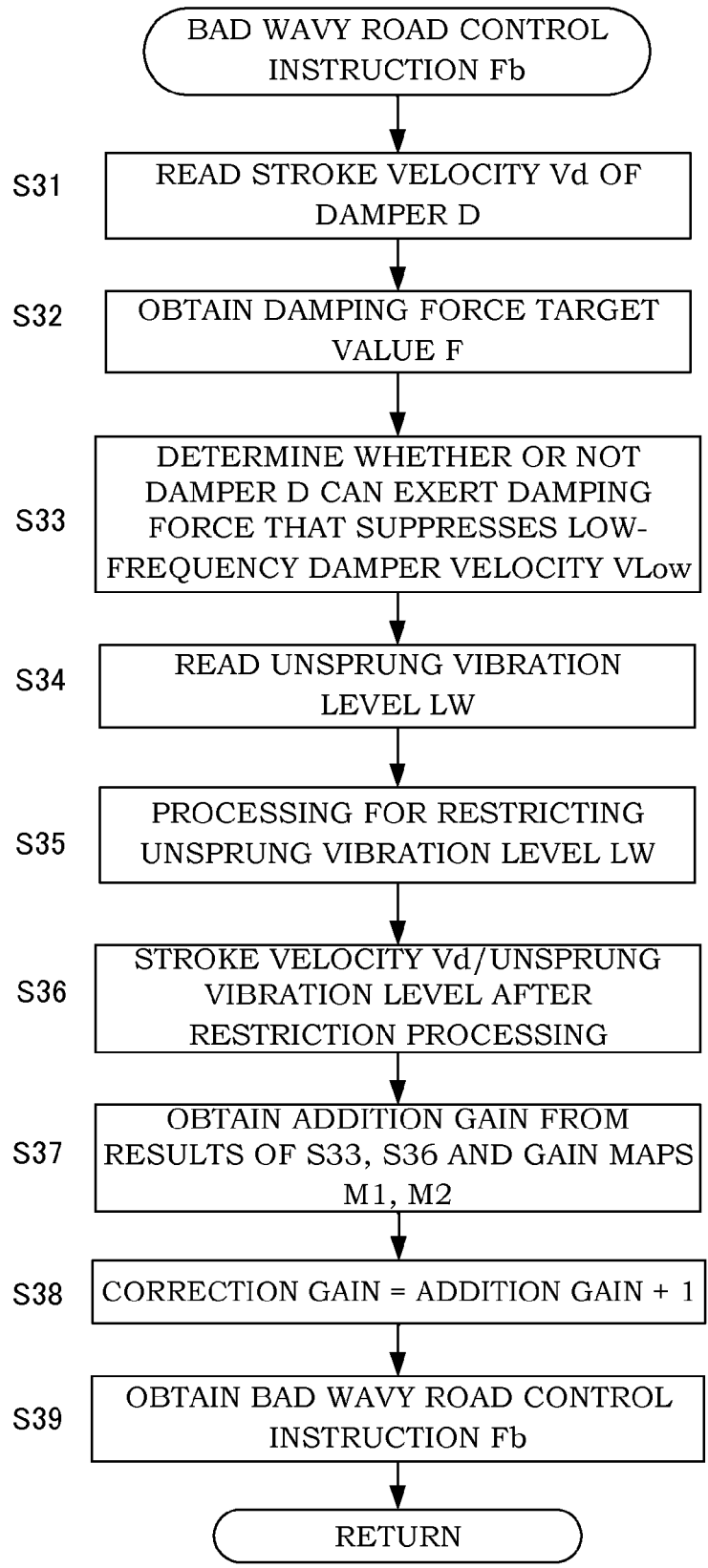
FIG. 23 is a flowchart showing processing for calculating a bad wavy road control instruction Fb, which is executed in step S8 of FIG. 20.

FIG. 23 is a flowchart showing processing for calculating a bad wavy road control instruction Fb, which is executed in step S8 of FIG. 20. In step S31, the damper control device E reads a stroke velocity Vd. In step S32, the damper control device E obtains a damping force target value F from a damping property that has been prepared in advance and from the stroke velocity Vd. In step S33, the damper control device E determines whether or not a damper D can exert a damping force that suppresses a low-frequency damper velocity VLow. In step S34, the damper control device E reads an unsprung vibration level LW. In step S35, the damper control device E executes processing for restricting the unsprung vibration level LW to a lower limit value if the value thereof falls below the lower limit value, and to an upper limit value if the value thereof exceeds the upper limit value. In step S36, the damper control device E divides the stroke velocity Vd by the unsprung vibration level processed in step S35. In step S37, the damper control device E obtains an addition gain on the basis of the result of determination in step S33, on the quotient from step S36, and on gain maps M1, M2. In step S39, the damper control device E obtains a bad wavy road control instruction Fb by multiplying the damping force target value F by a correction gain.

As described above, the stroke velocity Vd is normalized in map calculation by the gain calculation unit 63 by providing the division unit 62. In this way, there is no need to prepare a large number of correction gain maps corresponding to unsprung vibration levels LW as long as one gain map M1 and one gain map M2 are prepared respectively for a case in which a direction of vibration of the sprung member and a direction of vibration of the damper D match and for a case in which these directions do not match. Consequently, calculation is simplified and a storage capacity in the damper control device E can be reduced.

Furthermore, in a case where there is no need to avoid a sudden change in a damping force, a correction gain G may be obtained by preparing a map for obtaining an addition gain or a correction gain G from the stroke velocity Vd without performing normalization using an unsprung vibration level LW, instead of preparing correction gain maps corresponding to unsprung vibration levels LW. Although the gain maps M1, M2 have line symmetry with respect to the vertical axis, no limitation is intended in this regard.

It should be noted that the gain maps M1, M2 have line symmetry with respect to a line at zero on the vertical axis, and values obtained by applying map calculation based on the gain maps M1, M2 to a value of an arbitrary normalized stroke velocity Vd/LW have opposite signs from each other. Correction gains G are obtained by adding one to these values. A sum of the correction gains G is two. In the present embodiment, a damping property of the damper D is such that, with respect to an arbitrary stroke velocity Vd, a damping force has the same absolute value along the extension and compression of the damper D, and an extension-compression ratio, which is a ratio between an extension-side damping force and a compression-side damping force, is one. Therefore, provided that a correction gain G is obtained in the above-described manner, a sum of a value of the extension-side damping force and a value of the compression-side damping force of the damper D with respect to an arbitrary stroke velocity Vd has the same value before and after a damping force target value F is multiplied by the correction gain G. In this way, a damping force output in one stroke cycle of the damper D and an amount of energy absorption calculated using the stroke velocity Vd are equal before and after the damping force target value F is multiplied by the correction gain G. Regarding control of vibration of the unsprung member, vibration of the unsprung member can be suppressed sufficiently as long as the amount of energy absorption of the damper D is the same. Therefore, by achieving the same total amount of damping force before and after the damping force target value F is multiplied by the correction gain G as described above, a vibration damping amount that is necessary and sufficient for suppressing vibration of the unsprung member is secured. As a result, control of vibration of the unsprung member is not adversely affected.

Although a bad wavy road control instruction Fb provided to the driving unit 27, which actually drives the damping force adjustment unit 18 of the damper D, is obtained by multiplying the damping force target value F by the correction gain G in the present embodiment, a bad wavy road control instruction Fb may be obtained from a stroke velocity Vd and a damping property map that has been corrected by multiplying a damping property by the correction gain G. Furthermore, it is permissible to, for example, prepare several damping properties, select a damping property optimal for control of vibration of the unsprung member in accordance with a value of an unsprung vibration level LW, obtain a damping force target value F on the basis of the selected damping property, and correct the damping force target value F using a correction gain G.

Figure 16:
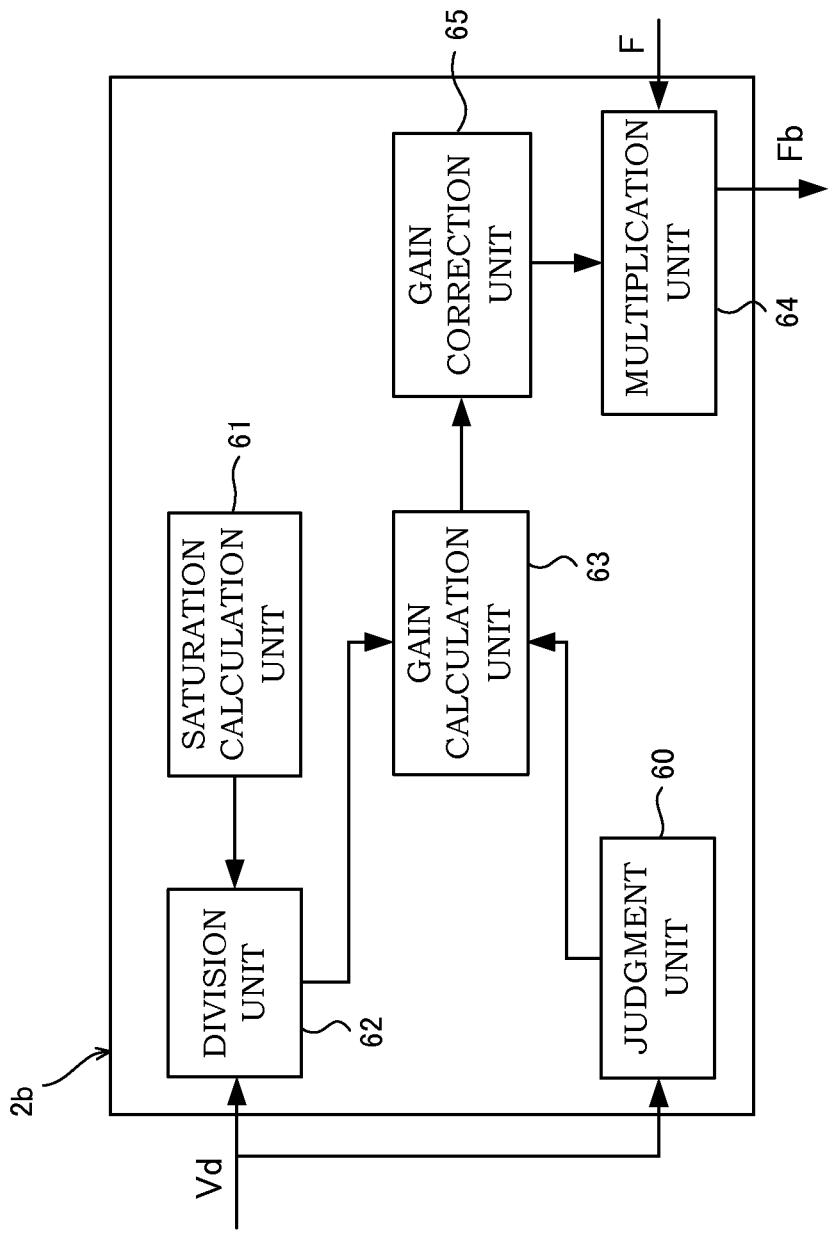
FIG. 16 shows a modification example of a part of the configuration of the bad wavy road calculation unit in detail.

A gain obtained by the gain calculation unit 63 may be corrected using a value of a low-frequency damper velocity VLow. For example, as shown in FIG. 16, the control instruction generation unit 2b includes a gain correction unit 65 subsequent to the gain calculation unit 63. In a case where the value of the low-frequency damper velocity VLow is small, the gain correction unit 65 multiplies the gain obtained by the gain calculation unit 63 by a correction gain that takes a value equal to or smaller than one. In this way, the extent of change in a damping coefficient is reduced by reducing a gain for a case in which a low-frequency damper velocity VLow is low. Especially, a sudden decrease in a damping force of the damper D is alleviated when a velocity direction of a low-frequency component of the stroke velocity Vd of the damper D is inverted. As a result, ride quality of the vehicle can be further improved.

Figure 17:
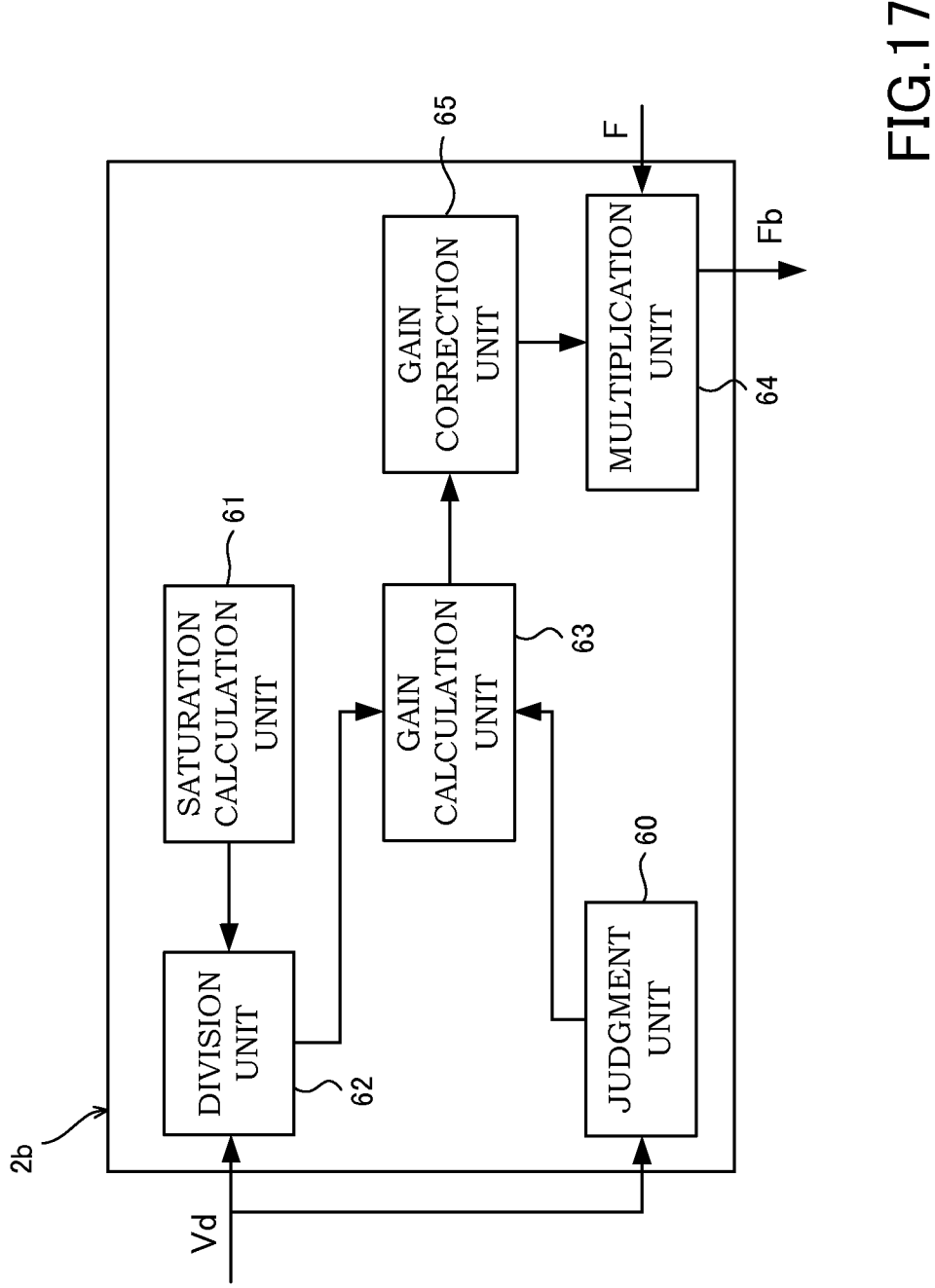
FIG. 17 shows a modification example of a part of the configuration of the bad wavy road calculation unit in detail.

Furthermore, it is permissible to correct a gain obtained by the gain calculation unit 63 in accordance with a vehicle speed, independently from the above-described correction gain G. For example, as shown in FIG. 17, the control instruction generation unit 2b includes a gain speed correction unit 66 subsequent to the gain calculation unit 63. The gain speed correction unit 66 corrects the gain obtained by the gain calculation unit 63 by multiplying the same by a speed correction gain that gradually increases as a vehicle speed increases. In this way, vibration of a low-frequency damper velocity VLow suitable for the vehicle speed can be suppressed, and ride quality of the vehicle can be further improved. It should be noted that the above-described gain correction based on the vehicle speed and the above-described gain correction based on a value of a low-frequency damper velocity VLow may be set independently from each other, and both of the corrections may be executed.

A good wavy road control instruction Fg and a bad wavy road control instruction Fb are obtained for each of the four dampers D. The final instruction calculation unit 3 obtains a final control instruction Ff for each of the dampers D on the basis of a good wavy road control instruction Fg and a bad wavy road control instruction Fb. That is to say, on the basis of a good wavy road control instruction Fg and a bad wavy road control instruction Fb obtained for one damper D, the final instruction calculation unit 3 obtains a final control instruction Ff for this damper D. For example, provided that a damper D interposed between a right front vehicle wheel W and the vehicle body B of the vehicle is a right front damper, a final control instruction Ff for the right front damper is obtained on the basis of a good wavy road control instruction Fg and a bad wavy road control instruction Fb obtained for the right front damper. The final instruction calculation unit 3 obtains a final control instruction Ff for every one of the other dampers D in a similar manner.

Figure 18:
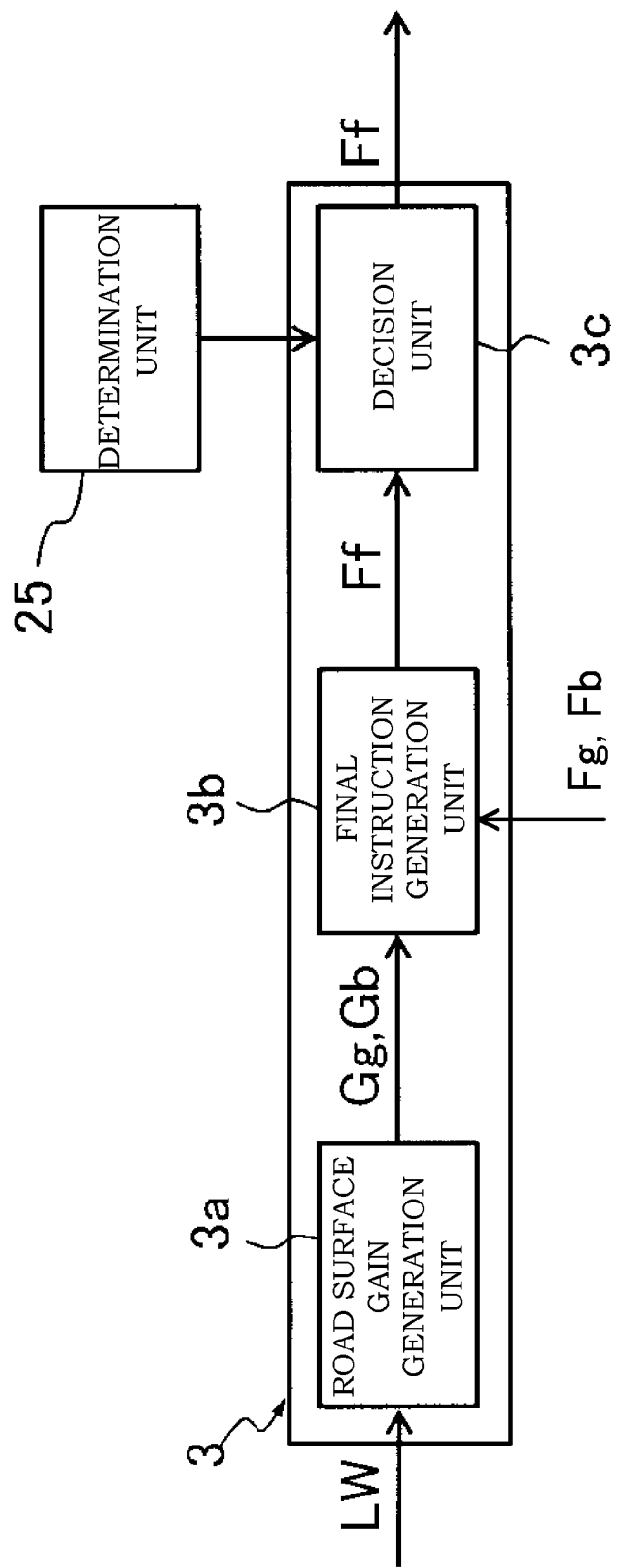
FIG. 18 shows a configuration of a final instruction calculation unit.

As shown in FIG. 18, the final instruction calculation unit 3 includes a road surface gain generation unit 3a, a final instruction generation unit 3b, and a decision unit 3c. The road surface gain generation unit 3a obtains a good road gain Gg, which changes from one to zero in accordance with an input unsprung vibration level LW, and a bad road gain Gb. The final instruction generation unit 3b obtains a final control instruction Ff by adding the following values: a product of the good road gain Gg obtained by the road surface gain generation unit 3a and a good wavy road control instruction Fg; and a product of the bad road gain Gb obtained by the same and a bad wavy road control instruction Fb. Upon receiving the result of determination by the determination unit 25 as input, the decision unit 3c decides whether to enable or disable the final control instruction Ff.

The road surface gain generation unit 3a has a map showing a relationship between an unsprung vibration level LW and a good road gain Gg. Upon receiving an unsprung vibration level LW as input, the road surface gain generation unit 3a obtains a good road gain Gg by performing map calculation. Once the good road gain Gg has been obtained, the road surface gain generation unit 3a obtains a bad road gain Gb by subtracting this good road gain Gg from one. The value of the good road gain Gg decreases as the unsprung vibration level LW increases. The good road gain Gg is one until the value of the unsprung vibration level LW becomes equal to or larger than a lower value that is arbitrarily set. The good road gain Gg is zero when the value of the unsprung vibration level LW becomes equal to or larger than an upper value that is arbitrarily set and larger than the lower value. The good road gain Gg changes from one to zero in accordance with an increase in the value of the unsprung vibration level LW between the lower value and the upper value.

The final control instruction Ff is obtained by adding the following values: a product of a good road gain Gg and a good wavy road control instruction Fg; and a product of a bad road gain Gb and a bad wavy road control instruction Fb. That is to say, in a case where the value of the unsprung vibration level LW is smaller than the lower value and a road surface is estimated to be a good road, the good wavy road control instruction Fg is enabled, whereas the bad wavy road control instruction Fb is disabled. In a case where the value of the unsprung vibration level LW is equal to or larger than the upper value and the road surface is estimated to be a bad road, the good wavy road control instruction Fg is disabled, whereas the bad wavy road control instruction Fb is enabled. In a case where the value of the unsprung vibration level LW is equal to or larger than the lower value and is smaller than the upper value and the road surface is estimated to be intermediate between a good road and a bad road, the final control instruction Ff is obtained by changing a ratio between the good wavy road control instruction Fg and the bad wavy road control instruction Fb in accordance with a magnitude of the unsprung vibration level LW. By obtaining the final control instruction Ff in the above-described manner, it is possible to perform control for switching between good wavy road control and bad wavy road control by causing them to fade in and fade out, depending on a road surface condition. Therefore, even if the road surface condition is intermediate between a good road and a bad road, a damping force generated by a damper D can be optimized for the road surface.

The decision unit 3c keeps the final control instruction Ff enabled as-is if the determination unit 25 determines the road surface to be a wavy road, and sets the value of the final control instruction Ff to zero if the determination unit 25 does not determine the road surface to be a wavy road. The decision unit 3c then outputs the final control instruction Ff to the current value calculation unit 26. That is to say, the final instruction calculation unit 3 enables the final control instruction Ff suitable for a wavy road if the road surface is determined to be a wavy road, and sets the final control instruction Ff to zero so as to disable the above-described wavy road control if the road surface is not determined to be a wavy road. The final instruction calculation unit 3 then sends the instruction to the current value calculation unit 26.

Figure 24:
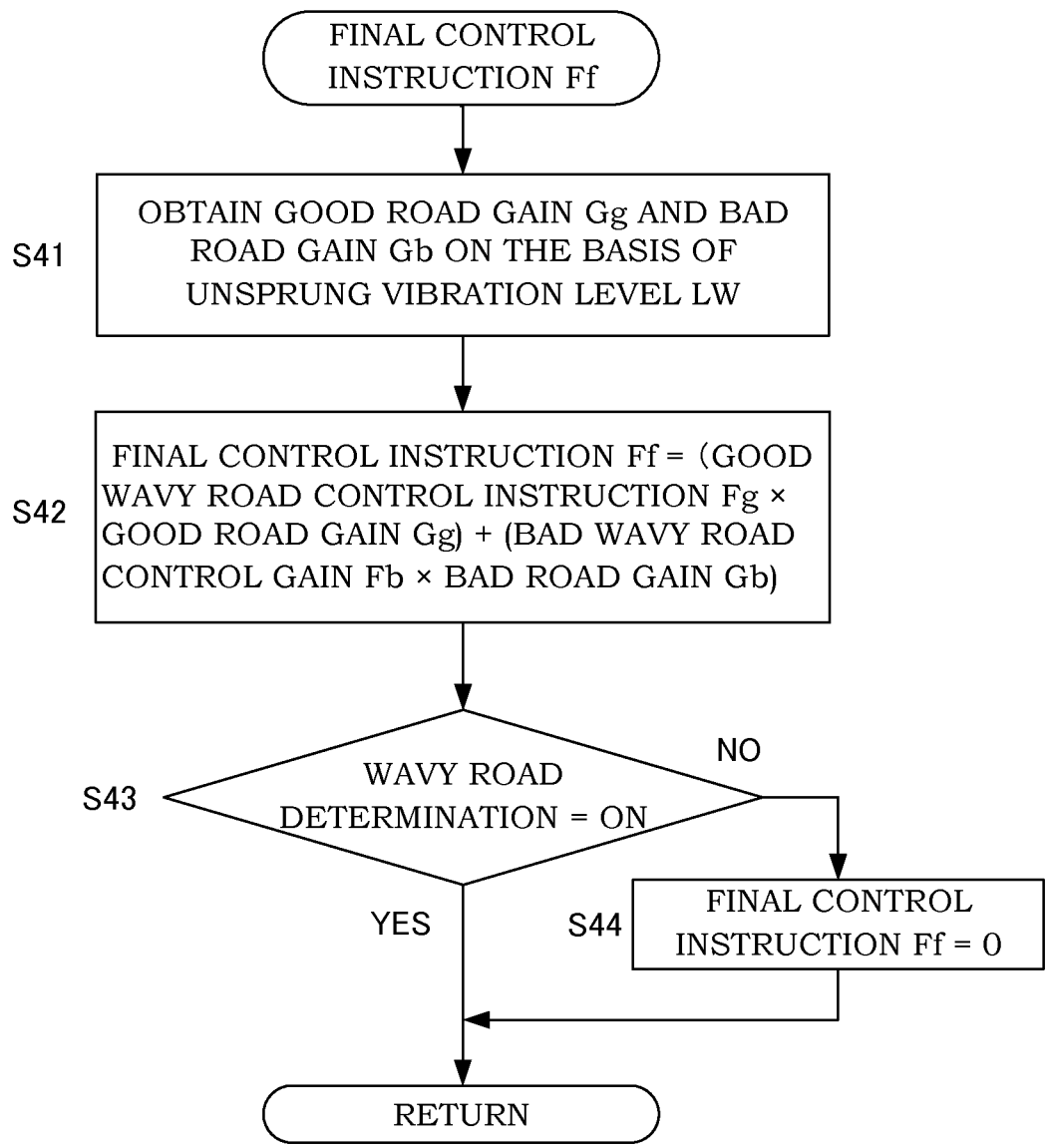
FIG. 24 is a flowchart showing processing for calculating a final control instruction Ff, which is executed in step S9 of FIG. 20.

FIG. 24 is a flowchart showing processing for calculating a final control instruction Ff, which is executed in step S9 of FIG. 20. In step S41, the damper control device E obtains a good road gain Gg, which changes from one to zero, and a bad road gain Gb on the basis of the unsprung vibration level LW. In step S42, the damper control device E obtains a final control instruction Ff by adding a product of the good wavy road control instruction Fg and the good road gain Gg and a product of the bad wavy road control instruction Fb and the bad road gain Gb. In step S43, the damper control device E determines whether or not the vehicle is running on a wavy road. If the vehicle is running on a wavy road, the value of the final control instruction Ff is used as-is. If the vehicle is not running on a wavy road, processing proceeds to step S44 and the final control instruction Ff is set to zero.

It should be noted that a control instruction for non-wavy road control other than the above-described wavy road control is set to zero if the determination unit 25 determines that the vehicle is running on a wavy road, and is set to a value obtained in accordance with a control rule for a non-wavy road if the determination unit 25 does not determine that the vehicle is running on a wavy road. The control instruction for non-wavy road control is then input to the current value calculation unit 26 together with the aforementioned final control instruction Ff.

The current value calculation unit 26 obtains a current value I provided to a damping force adjustment unit 18 on the basis of the result of comparing a control instruction for a non-wavy road with the final control instruction Ff and selecting a larger one of the instructions. The determination unit 25 switches between determination of a wavy road and determination of a non-wavy road on the basis of determination of whether the wavy road control and the non-wavy road control are enabled or disabled. As these determinations are performed through fade-in and fade-out, a sudden change in a damping force of a damper D can be alleviated.

The driving unit 27 includes, for example, a PWM circuit and the like, and supplies an amount of current compliant with the current value I obtained by the current value calculation unit 26 to a damping force adjustment unit 18. Each damper D exerts a damping force compliant with the final control instruction Ff if the vehicle is determined to be running on a wavy road. The driving unit 27 includes a compensator for PI compensation, PID compensation, and the like, and performs feedback control for current that flows into the damping force adjustment unit 18 so as to supply current compliant with the current value I to the damping force adjustment unit 18. It should be noted that the driving unit 27 may not perform feedback control.

On a wavy road, the damper control device E obtains, for each of the plurality of dampers D provided in the vehicle, a final control instruction Ff on the basis of a good wavy road control instruction Fg and a bad wavy road control instruction Fb. Therefore, even when the vehicle wheels W are running on the road surfaces of different conditions, each of the dampers D can exert a damping force suitable for the condition of the road surface on which the corresponding vehicle wheel W is running. In this way, the road surface tracking property and the ride quality of the vehicle can be improved.

Furthermore, in the damper control device E, the final instruction calculation unit 3 obtains a good road gain Gg and a bad road gain Gb by which a good wavy road control instruction Fg and a bad wavy road control instruction Fb are multiplied, respectively, and obtains a final control instruction Ff on the basis of a product of the good wavy road control instruction Fg and the good road gain Gg and on a product of the bad wavy road control instruction Fb and the bad road gain Gb. In this way, even if the road surface condition is intermediate between a good road and a bad road, the dampers D can output a damping force that is optimal for the road surface condition, and a sudden change in the damping force of the dampers D can be alleviated by causing good wavy road control and bad wavy road control to fade in and fade out depending on the road surface condition. Consequently, the road surface tracking property and the ride quality of the vehicle can be further improved.

Furthermore, in the damper control device E, a sum of the good road gain Gg and the bad road gain Gb is set to one, and therefore the final control instruction Ff can be prevented from being excessive or inadequate.

Furthermore, in a case where the vehicle passes over sporadic protrusions and convexities while running on a flat road surface during execution of the bad wavy road control, vibrations of the unsprung members are transmitted to the sprung member, and vibration in a sprung resonant frequency range is excited in the sprung member. At this time, the damper control device E can not only suppress the vibration of the sprung member by suppressing low-frequency damper velocities VLow of stroke velocities Vd of the dampers D, but also cause the sprung member to track the flat road surface. Therefore, without performing skyhook control, the vibration of the sprung member can be controlled on the same level as per a case where skyhook control is performed.

Furthermore, the damper control device E includes the determination unit 25, which determines whether or not the vehicle is running on a wavy road, and enables the final control instruction Ff if it is determined that the vehicle is running on a wavy road. This enables timely execution of control suitable for a wavy road.

Furthermore, in the damper control device E, the determination unit 25 determines whether or not the vehicle is running on a wavy road on the basis of a sprung vibration level LB, which represents a magnitude of vibration of the vehicle body B. It is hence possible to accurately determine whether or not the vehicle is running on a wavy road, and to accurately switch between wavy road control and non-wavy road control.

Furthermore, the damper control device E includes the speed correction unit 1*d* that corrects a good wavy road control instruction Fg on the basis of a sprung vibration level LB and a vehicle speed. Therefore, even if the sprung vibration level LB has the same value, the good wavy road control instruction Fg is larger when the vehicle speed is high than when the vehicle speed is low, and a damping force generated by the dampers D is larger when the vehicle speed is high than when the vehicle speed is low. Consequently, the orientation of the vehicle body of the vehicle can be stabilized.

Furthermore, the damper control device E includes the acceleration correction unit 1*e* that corrects a good wavy road control instruction Fg on the basis of stroke acceleration αd of each damper D. Therefore, the good wavy road control instruction Fg is smaller when the stroke acceleration αd is large than when the stroke acceleration αd is small. Consequently, a sudden change in a damping force of the dampers D is alleviated, and degradation in the ride quality of the vehicle can be prevented.

This concludes the description of the embodiment of the present invention. It should be noted that the above-described embodiment merely illustrates one application example of the present invention, and is not intended to limit a technical scope of the present invention to specific configurations of the above-described embodiment. [0119] For example, the damper control device E includes the following as hardware resources: an A/D converter for importing a signal output by a sensor unit; a storage device that stores therein a program used in processing necessary for detection of a vibration level and calculation of a current value I, such as a read-only memory (ROM); a calculation device that executes processing based on the program, such as a central processing unit (CPU); and a storage device that provides a storage area to the CPU, such as a random-access memory (RAM). It is sufficient to realize the operations of the damper control device E by the CPU executing the program.

Furthermore, in the above-described embodiment, the damping properties of the dampers D are set such that a magnitude of a damping force is the same along the extension and compression of the dampers D with respect to an arbitrary stroke velocity Vd. However, the above-described embodiment is applicable also to dampers that do not have such damping properties. In this case, an amount of damping force that is necessary and sufficient for suppressing vibration of the vehicle wheels W is secured by changing the damping properties, at the time of generation of a bad wavy road control instruction Fb, such that a total of an amount of damping force output during extension of the dampers D and an amount of damping force output during compression of the dampers D is the same. Therefore, control of vibration of the vehicle wheels W is not adversely affected.

Furthermore, an unsprung vibration level LW of a vehicle wheel W is not limited to being detected through detection of a relative displacement between a cylinder 12 and a piston rod 14 detected by a stroke sensor 20. It may instead be detected by mounting a sensor on, for example, an arm via which the vehicle wheel W is swingably attached to the vehicle body B, directly detecting the acceleration of the vehicle wheel W in the up-down direction, and obtaining a first reference value using the acceleration in the up-down direction. Also, the stroke sensors 20 may be integrated into the dampers D.

Furthermore, while a four-wheel vehicle has been explained as a model in the above-described embodiment, the above-described embodiment is similarly applicable to a case in which a vehicle has four or more vehicle wheels W. Also, the good wavy road control calculation unit 1 and the bad wavy road control calculation unit 2 are merely illustrative, and are not limited to the above description.

Furthermore, in the above-described embodiment, the damper control device E determines whether a road surface on which the vehicle is running is a good wavy road or a bad wavy road. In this determination, the target of determination is not the road surface; rather, a condition of the road surface is estimated by evaluating conditions of vibrations of the sprung member and the unsprung members using a sprung vibration level LB and unsprung vibration levels LW. Therefore, it is not that good wavy road control and bad wavy road control are performed only when the road surface is actually a wavy road. These controls are performed in a situation where the sprung vibration level LB is large, even if the road surface is not a wavy road. Consequently, the road surface tracking property of the sprung member is improved.

This application claims priority based on Japanese Patent Application No. 2013-050132 filed with the Japan Patent Office on Mar. 13, 2013, the entire contents of which are incorporated into this specification.

The invention claimed is:

1. A damper control device for controlling a damping force of each damper of a vehicle interposed between a vehicle body of the vehicle and a corresponding one of a plurality of vehicle wheels of the vehicle, the damper control device comprising;
    a good wavy road control calculation unit configured to obtain, for each damper, a good wavy road control instruction to generate a target damping force for a good wavy road representing a wavy road surface;
    a bad wavy road control calculation unit configured to obtain, for each damper, a bad wavy road control instruction to generate a target damping force for a bad wavy road that has more concavities and convexities than the good wavy road; and
    a final instruction calculation unit configured to obtain, for each damper, a final control instruction on the basis of the good wavy road control instruction of the damper and the bad wavy road control instruction of the damper, wherein
    for each damper, the final instruction calculation unit is configured to obtain a good road gain and a bad road gain to be respectively multiplied by the good wavy road control instruction and the bad wavy road control instruction, and obtain the final control instruction on the basis of a value obtained by multiplying the good wavy road control instruction and the good road gain and on a value obtained by multiplying the bad wavy road control instruction and the bad road gain,
    the final instruction calculation unit is configured to obtain the good road gain and the bad road gain on the basis of an unsprung vibration level representing a magnitude of vibration of each of the vehicle wheels, and a sum of the good road gain and the bad road gain is one.

2. The damper control device according to claim 1, further comprising a determination unit configured to determine whether or not the vehicle is running on a wavy road, wherein each damper is controlled on the basis of the final control instruction for the damper if it is determined that the vehicle is running on the wavy road.

3. The damper control device according to claim 2, wherein the determination unit is configured to determine whether or not the vehicle is running on the wavy road on the basis of a sprung vibration level representing a magnitude of vibration of the vehicle body.

4. The damper control device according to claim 1, wherein the good wavy road control calculation unit comprises a speed correction unit configured to correct the good wavy road control instruction of each damper on the basis of a sprung vibration level representing a magnitude of vibration of the vehicle body and a speed of the vehicle.

5. The damper control device according to claim 1, wherein the good wavy road control calculation unit comprises an acceleration correction unit configured to correct the good wavy road control instruction on the basis of a stroke acceleration of each damper.

6. The damper control device according to claim 1, wherein the good wavy road control calculation unit is configured to obtain, in accordance with a stroke speed of each damper, the good wavy road control instruction, for each damper, and the bad wavy road control calculation unit is configured to obtain, in accordance with the stroke speed of each damper and the unsprung vibration level representing a magnitude of vibration of each of the vehicle wheels, the bad wavy road control instruction for each damper.

7. A damper control device for controlling a damping force of each damper of a vehicle interposed between a vehicle body of the vehicle and a corresponding one of a plurality of vehicle wheels of the vehicle, the damper control device comprising:

a good wavy road control calculation unit configured to obtain, for each damper, a good wavy road control instruction to generate a target damping force for a good wavy road representing a wavy road surface;

a bad wavy road control calculation unit configured to obtain, for each damper, a bad wavy road control instruction to generate a target damping force for a bad wavy road that has more concavities and convexities than the good wavy road; and a final instruction calculation unit configured to obtain, for each damper, a final control instruction on the basis of the good wavy road control instruction of the damper and the bad wavy road control instruction of the damper, wherein for each damper, the final instruction calculation unit is configured to obtain a good road gain and a bad road gain to be respectively multiplied by the good wavy road control instruction and the bad wavy road control instruction, and obtain the final control instruction on the basis of a value obtained by multiplying the good wavy road control instruction and the good road gain and on a value obtained by multiplying the bad wavy road control instruction and the bad road gain, for each damper, the final instruction calculation unit is configured to obtain the good road gain and the bad road gain on the basis of an unsprung vibration level representing a magnitude of vibration of the corresponding one of the vehicle wheels, and a sum of the good road gain and the bad road gain is one.

8. The damper control device according to claim 7, further comprising a determination unit configured to determine whether or not the vehicle is running on a wavy road, wherein each damper is controlled on the basis of the final control instruction for the damper if it is determined that the vehicle is running on the wavy road.

9. The damper control device according to claim 8, wherein the determination unit is configured to determine whether or not the vehicle is running on the wavy road on the basis of a sprung vibration level representing a magnitude of vibration of the vehicle body.

10. The damper control device according to claim 7, wherein the good wavy road control calculation unit comprises a speed correction unit configured to correct the good wavy road control instruction of each damper on the basis of a sprung vibration level representing a magnitude of vibration of the vehicle body and a speed of the vehicle.

11. The damper control device according to claim 7, wherein the good wavy road control calculation unit comprises an acceleration correction unit configured to correct the good wavy road control instruction on the basis of a stroke acceleration of each damper.

12. The damper control device according to claim 7, wherein the good wavy road control calculation unit is configured to obtain, in accordance with stroke speed of each damper, the good wavy road control instruction, for each damper, and the bad wavy road control calculation unit is configured to obtain, in accordance with a stroke speed of each damper and the unsprung vibration level representing a magnitude of vibration of each of the vehicle wheels, the bad wavy road control instruction for each damper.

* * * * *